(12) United States Patent
Green

(10) Patent No.: US 6,430,505 B1
(45) Date of Patent: Aug. 6, 2002

(54) AUTOMATIC CHARTING OF OBSTRUCTIONS FOR MISSION PLANNING

(75) Inventor: James C. Green, Los Altos Hills, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/637,851

(22) Filed: Aug. 10, 2000

Related U.S. Application Data

(63) Continuation-in-part of application No. 09/614,392, filed on Jul. 12, 2000, now Pat. No. 6,353,798.

(51) Int. Cl.[7] ............................................. G01C 21/02
(52) U.S. Cl. ................... 701/214; 701/200; 342/357.15
(58) Field of Search ................................. 701/207, 200, 701/217, 213, 208, 214; 342/357.06, 357.13, 357.15

(56) References Cited

U.S. PATENT DOCUMENTS

| | | | |
|---|---|---|---|
| 4,851,775 A | * 7/1989 | Kim et al. | 324/247 |
| 5,331,563 A | * 7/1994 | Masumoto et al. | 364/449 |
| 5,946,603 A | * 8/1999 | Ibanez-Meier et al. | 455/13.1 |

* cited by examiner

*Primary Examiner*—Michael J. Zanelli
(74) *Attorney, Agent, or Firm*—Wagner Murabito & Hao LLP

(57) ABSTRACT

A method and system for generating and maintaining a database comprising a location-sensitive timetable. At multiple locations, a device (e.g., an integrated position and direction system) listens for broadcast signals from broadcasting devices (e.g., Global Positioning System satellites). For each location, the device records the time and date and the number of satellites from which a signal is received. The device can also record the identities of satellites that can and cannot be picked up. The information recorded by the device can be used to automatically generate a timetable showing the dates and times of day for each location that are and are not satisfactory for doing data maintenance, based on the number of satellites available for viewing. The recorded information can also be used to automatically predict future dates and times for each location that will or will not be satisfactory for data maintenance. Each visit to a location accumulates additional information regarding when satellites will and will not be available for viewing. In this manner, a timetable is automatically generated and updated. The timetable can be automatically factored into mission planning for data maintenance by creating a schedule for visiting each location when satellite viewing will be satisfactory.

28 Claims, 20 Drawing Sheets

AUTOMATIC CHARTING OF OBSTRUCTIONS FOR MISSION PLANNING

CROSS REFERENCE TO RELATED APPLICATION

This Application is a Continuation-in-Part of commonly-owned U.S. patent application Ser. No. 09/614,392, filed Jul. 12, 2000, now U.S. Pat. No. 6,353,798, by J. Green et al., and entitled "Integrated Position and Direction System with Three-Sensor Digital Compass."

TECHNICAL FIELD

This invention relates to position determination systems, in particular an apparatus for indicating direction and heading. Specifically, the present invention pertains to a method for using such an apparatus to generate and maintain an up-to-date database of object locations and characteristics.

BACKGROUND ART

Satellite positioning system (SATPOS) devices that determine position using the satellites of the US Global Positioning System (GPS) are commonly used for navigation of vessels, vehicles, airplanes, and other conveyances. SATPOS devices are also used for surveying, construction site planning and management, mining, oil and gas exploration and development, etc. Also, handheld SATPOS devices are used for personal navigation, data collection, data maintenance, etc.

SATPOS devices are quite effective for indicating the position of the SATPOS device. Position is typically indicated using either an alphanumeric indication of position or by displaying a map that indicates position. Alphanumeric indications of position typically include coordinates such as, for example, latitude and longitude, World Geodetic Survey (WGS) coordinates, etc.

Map displays typically indicate position by an icon or other indicator visible on a map. One such map display, typically referred to as a moving map display, displays the position of the SATPOS in the center of the displayed map. Such map displays typically are oriented such that the top of the SATPOS device's display indicates North (either magnetic North or true North). That is, irrespective of the direction in which the SATPOS device is actually oriented, North is shown at the top of the display. For users that intuitively know which direction is North, such maps are adequate for locating features displayed on the map. However, for users that do not know where North is, or when visibility is obscured such that the user cannot determine where North is, such maps are inadequate for guiding the user to a destination or feature on the map.

For many commercial applications of SATPOS systems, such as construction site planning and management, surveying, navigation, etc., it is essential that an operator be able to locate features displayed on the map. Such users typically operate a separate device for indicating direction such as a conventional magnetic compass.

Some SATPOS devices indicate the direction of movement of the SATPOS device, typically referred to as "heading." Typically, heading is determined by analysis of determined position in relation to prior determinations of position as the SATPOS moves. Typically, SATPOS devices that indicate heading use a map display oriented such that the top of the SATPOS unit (e.g., the top of the unit's display) corresponds to North (either magnetic North or true North).

Some prior art SATPOS devices orient the displayed map such that the top of the SATPOS unit (e.g., the top of the unit's display) corresponds to the direction of movement calculated by the SATPOS device. This gives a good approximation of the user's heading as long as the user continues to move and as long as the SATPOS unit is oriented in the direction of movement, allowing a user to easily determine the location of features visible on the display.

However, when the SATPOS device stops moving, determination of heading can no longer be made. Some SATPOS systems maintain the previous heading for orienting the moving map display for a given time interval. Other prior art SATPOS systems default to positioning North at the top of the map. This can be quite confusing to the user.

Recently, digital compasses have been developed that can indicate direction. However, digital compasses must be calibrated to properly align the digital compass prior to use. Also, each time that magnetic environment around the compass changes, the digital compass must be recalibrated. Digital compasses are typically calibrated by moving the digital compass in a full horizontal arc. The calibration process takes time and is prone to operator error. Also, calibration error can occur as a result local magnetic anomalies.

What is needed is a method and apparatus for providing an accurate indication of heading to a user of a SATPOS device. Also, a method and apparatus are needed that meet the above need and that accurately indicate direction when the SATPOS is not moving. Also, a method and apparatus are needed that are easy to use and that do not require a user to manually calibrate a compass.

As described above, a SATPOS device can be used for surveying, construction site planning and management, mining, oil and gas exploration and development, etc. A problem occurs when a user arrives at a particular site and attempts to acquire positioning determining signals such as signals from GPS satellites. At any one location, four GPS satellites are typically "in view" (that is, they are in a position such that they could be used for acquiring a positioning determining signal). In general, signals from at least three satellites are needed to accurately determine position, direction and/or heading. However, at some sites, the SATPOS cannot acquire a signal from one or more of the satellites because the signal is obstructed by features present at the site. For example, at a downtown site, signals may be blocked at certain times of day by surrounding buildings. As the satellites move in their orbit, they may come into view of the site at a later time.

Thus, during certain periods of the day, a user may not be able to acquire a signal from a number of satellites sufficient for accurately determining position, direction and/or heading. If, instead, the user had arrived at the site at a different time, he or she would have been able to receive a signal from a sufficient number of satellites.

As a result, a user's time can be wasted because of having to make repeated visits to a particular location, or from having to wait at the site for a period of time, until enough satellites can be viewed so that accurate positioning information can be obtained. This problem is exacerbated for SATPOS applications in which a large number of sites have to be visited on a regular basis.

Accordingly, what is also needed is a method and/or system that can be used to identify when a sufficient number of satellites can be viewed at a particular location, so that positioning information (including direction and heading) can be accurately determined. Furthermore, what is needed is a method and/or system that can satisfy the above need and that is convenient to implement. The present invention meets this need and the above needs.

DISCLOSURE OF THE INVENTION

The present invention provides a method and apparatus that accurately indicate direction and heading to a user of a satellite positioning system (SATPOS) device. The present invention also provides a method and system for identifying when a sufficient number of satellites can be viewed at locations of interest so that positioning information can be accurately determined at each location. In addition, the present invention provides a method and system that are conveniently implemented.

An integrated position and direction system is disclosed that includes a SATPOS having a receiver adapted to receive satellite position determining signals. The integrated position and direction system of the present invention also includes a digital compass that is adapted to determine direction.

The integrated position and direction system also includes a controller for controlling the operations of the integrated position and direction system. The controller is coupled to the SATPOS, the digital compass, and to a display.

In one embodiment of the present invention, when the SATPOS is moving, the direction of movement or "heading" determined by the SATPOS is indicated on the display. When the SATPOS is not moving, the direction given by the digital compass is indicated on the display. Therefore, while the SATPOS is moving, the heading is indicated, and when the SATPOS is not moving, direction is indicated using the digital compass. Thus, the present invention provides a method and apparatus for providing an accurate indication of both heading and direction to a user of a SATPOS device.

In one embodiment, the digital compass is automatically calibrated by the SATPOS when the SATPOS is moving. This calibration can be initiated by the user or can be fully automatic. More particularly, the digital compass of the present invention is calibrated automatically, either as a result of user input (e.g., selection of an icon, pressing of a button, etc.), or as a result of user-defined criteria for automatic calibration. That is, the user can program the present invention to automatically calibrate the digital compass (e.g., when velocity exceeds a given threshold, whenever the SATPOS begins moving, periodically while the SATPOS is moving, when the difference between the SATPOS determined heading differs from the heading indicated by the digital compass by more than a predetermined threshold, etc.). Thus, the position and direction system of the present invention is easy to use because there in no need for a user to calibrate a compass as is required using a prior art compass alone.

In another embodiment, a method and system for generating and maintaining a database comprising a location-sensitive timetable are disclosed. At multiple locations, a receiving device (e.g., the SATPOS) listens for broadcast signals from broadcasting devices (e.g., satellites). For each location, the SATPOS records the time and date and the number of satellites from which a signal is received. The SATPOS can also record the identities of satellites that can and cannot be picked up. The information recorded by the SATPOS can be used to automatically generate a timetable showing the dates and times of day for each location that are and are not satisfactory for obtaining and maintaining positioning information, based on the number of satellites available for viewing. The recorded information can also be used to automatically predict future dates and times for each location that will or will not be satisfactory for obtaining and maintaining positioning information. Each visit to a location accumulates additional information regarding when satellites will and will not be available for viewing. In this manner, the timetable is automatically generated and updated. The timetable can be used as the basis for a schedule for visiting each location when satellite viewing will be satisfactory. In this manner, the timetable can be automatically factored into mission planning for data maintenance.

In an alternate embodiment, the position and characteristics (e.g., height, width, etc.) of the features (e.g., buildings, trees, canyons, and other such objects that might block a broadcast signal) at each location are recorded. This information is used along with satellite constellation information (e.g., issue of data ephemeris information) to predict the dates and times when satellites will be blocked from view of a SATPOS device. From this information, the timetable can then be generated and used as the basis for a schedule for mission planning.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
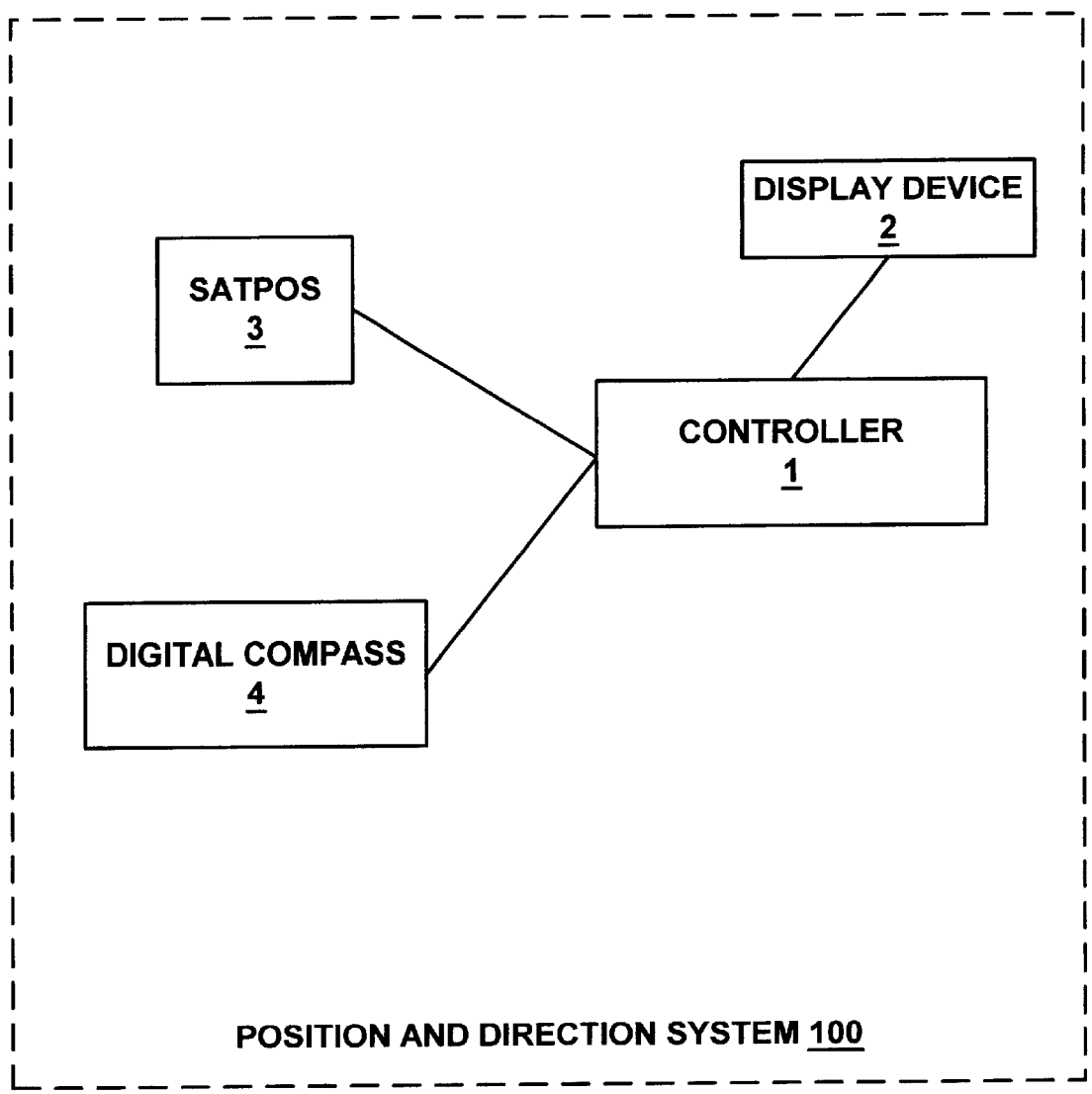
FIG. 1 is a diagram of a position and direction system in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as to not unnecessarily obscure aspects of the present invention.

NOTATION AND NOMENCLATURE

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking" or "recording" or "generating" or "determining" or "correlating" or "predicting" or "using" or "updating" or "identifying" or "receiving" or the like, refer to the action and processes of a computer system (e.g., processes 1300 and 1400 of FIGS. 13 and 14), or similar electronic computing device, that manipulates and transforms data represented as physical (electronic) quantities within the computer system's registers and memories into other data similarly represented as physical quantities within the computer system memories or registers or other such information storage, transmission or display devices.

INTEGRATED POSITION AND DIRECTION SYSTEM

FIG. 1 is a logical representation of components of integrated position and direction system 100 in accordance with one embodiment of the present invention. Integrated position and direction system 100 includes Satellite Positioning System (SATPOS) 3 that is operable for determining position. In one embodiment, SATPOS 3 is adapted to determine position using a Satellite Positioning System such as the US Global Positioning System (GPS).

In operation, SATPOS 3 determines the location of SATPOS 3 by analysis of satellite position determining signals such as signals from satellites of the US GPS. Position signal processing circuitry in SATPOS 3 also determines the direction of movement of SATPOS 3, referred to hereinafter as "heading" and couples the determined heading to controller 1. In the present embodiment, heading is determined by comparing satellite position determining signals received as the integrated position and direction system 100 moves.

Integrated position and direction system 100 of FIG. 1 also includes digital compass 4. Digital compass 4 is operable to determine direction and couple direction to controller 1. More particularly, in the present embodiment, digital compass 4 determines the compass direction that corresponds to the orientation of the integrated position and direction system 100.

Continuing with FIG. 1, controller 1 controls the operation of integrated position and direction system 100. In one embodiment, controller 1 is a general-purpose computer. Alternatively, controller 1 is an integrated circuit device such as a microcontroller or an Application Specific Integrated Circuit (ASIC) device or a Field Programmable Gate Array (FPGA) device. In one embodiment, the functions of controller 1 are performed by a general purpose microprocessor that is operable to execute instructions contained in one or more software program(s).

In the present embodiment, controller 1 is operable to display the determined position and the determined direction and/or heading on display 2. Display device 2 may be a liquid crystal device, flat panel display, or other display device suitable for creating graphic images and alphanumeric characters recognizable to the user.

Figure 2:
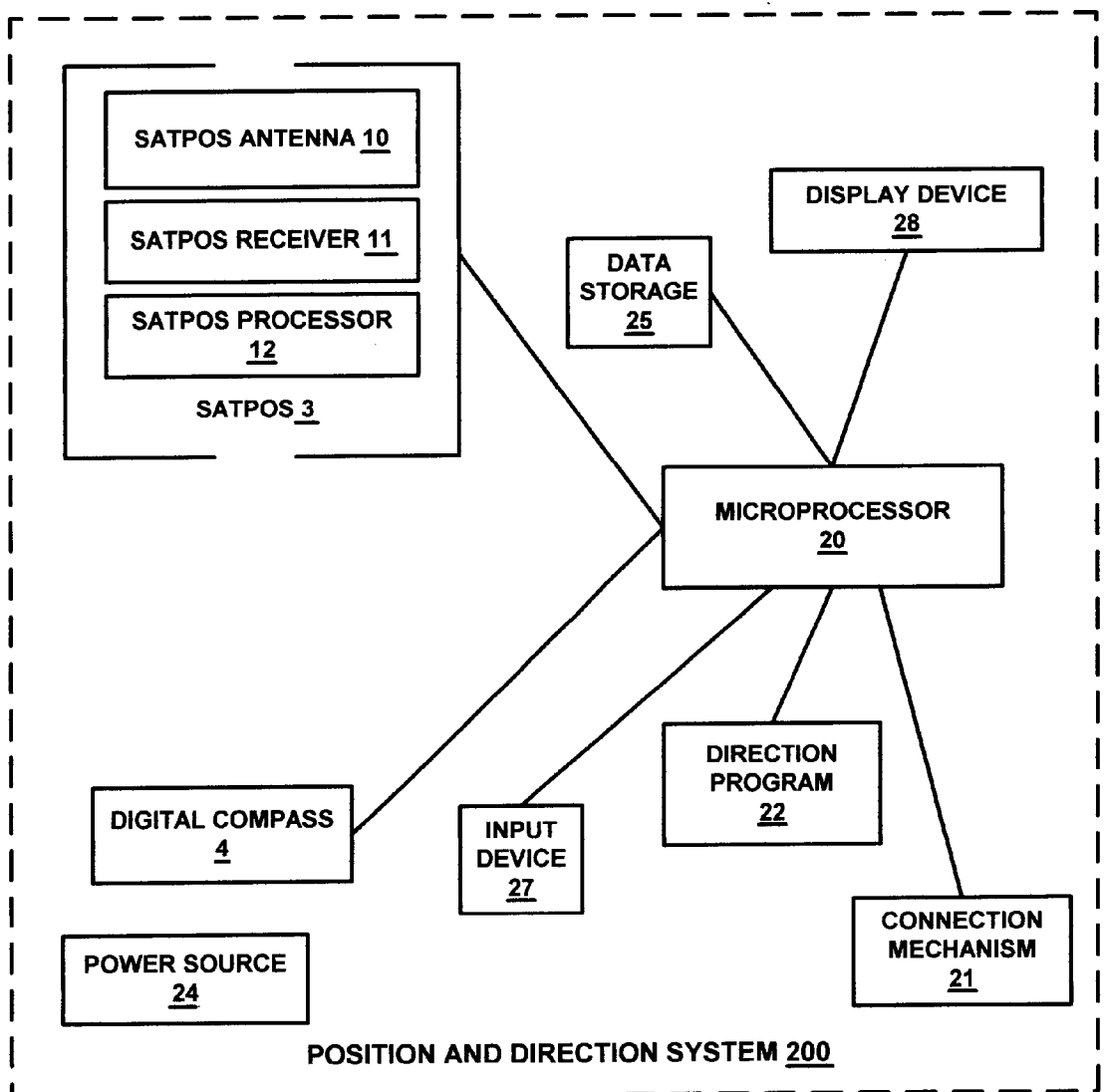
FIG. 2 is a diagram of an embodiment of the position and direction system of FIG. 1 in accordance with one embodiment of the present invention.
Figure 3:
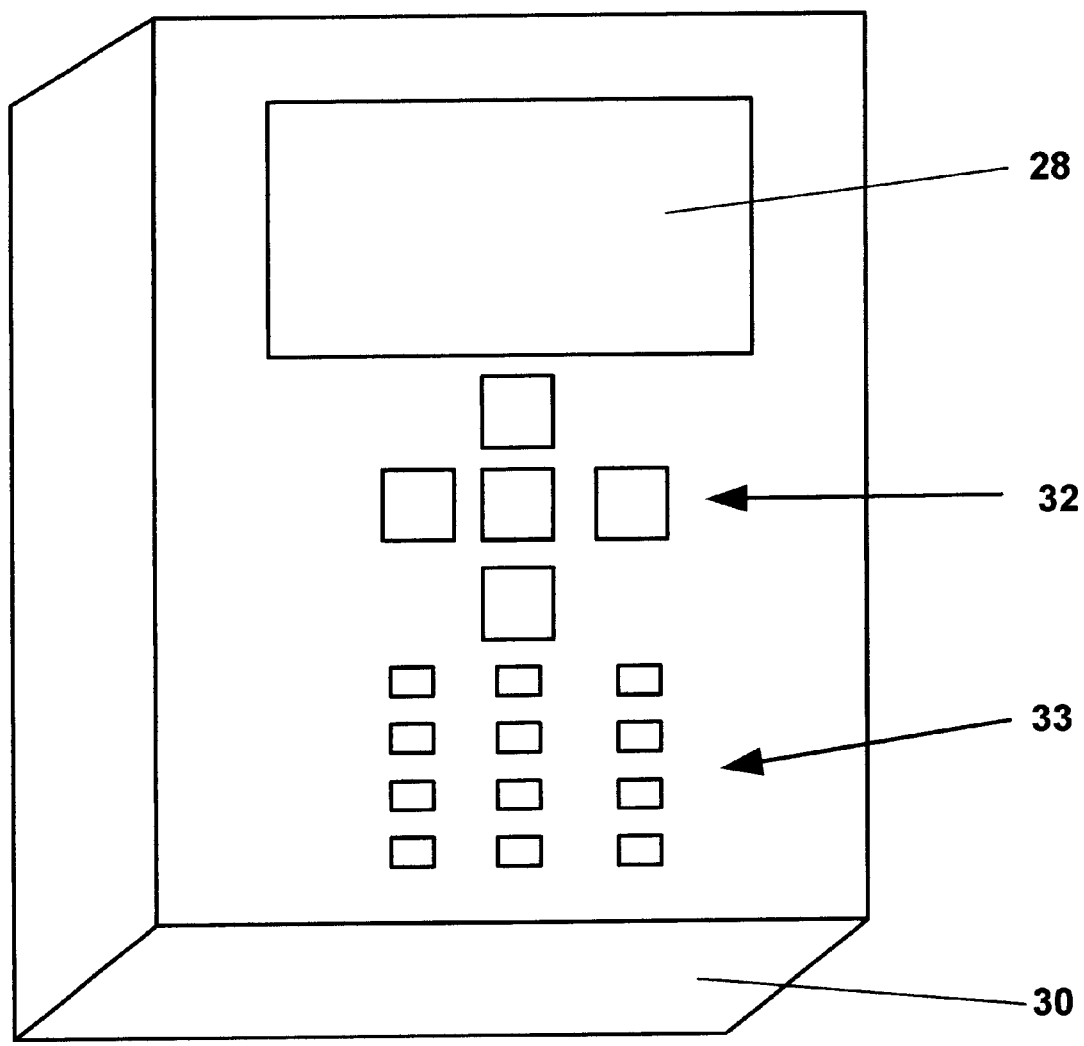
FIG. 3 is a perspective view of an embodiment of the position and direction system of FIG. 2 in accordance with one embodiment of the present invention.

FIGS. 2–3 show an embodiment of the present invention that is incorporated into a handheld portable housing. That is, the housing is small enough to fit into a user's hand.

Referring now to FIG. 2, integrated position and direction system 200 is shown to include SATPOS 3 that is operable for determining position. In the present embodiment, SATPOS 3 includes SATPOS antenna 10, SATPOS receiver 11, and SATPOS processor 12. In one embodiment, SATPOS processor 12 is a GPS processor made by Trimble Navigation, Ltd., of Sunnyvale, Calif. In this embodiment, SATPOS antenna 10 is an ACE II GPS™ antenna, manufactured by Trimble Navigation, Ltd. and SATPOS receiver 11 includes a SIERRA GPS™ chipset, manufactured by Trimble Navigation, Ltd. Although such a specific implementation is described, the present invention is also well suited to an embodiment having various other components and features.

Referring still to FIG. 2, microprocessor 20, in conjunction with direction program 22, performs the functions of controller 1 of FIG. 1. That is, in the present embodiment, direction program 22, operable on microprocessor 20, controls the operations of integrated position and direction system 200. In the present embodiment, microprocessor 20 is a general-purpose microprocessor that has low power consumption such as, for example, a Motorola RISC (reduced instruction set computer) microprocessor made by Motorola Inc. of Austin, Tex. Alternatively, another type of processor, an ASIC device or a FPGA device can be used.

Continuing with FIG. 2, power source 24 provides power to the various components of integrated position and direction system 200. Power source 24 may be any suitable power source that is light-weight and compact such as, for example, built-in rechargeable batteries, size AA batteries or size AAA batteries.

Data storage device 25 is coupled to controller 20 and is adapted to store data. Data that can be stored in data storage device 25 include, for example, an operating software program such as direction program 22. Data storage device can also be used to store data collected by SATPOS 3. Data storage device may be any type of digital data storage medium. In one embodiment, data storage device 25 is a Random Access Memory (RAM) device such as, for example, a Static Random Access Memory (SRAM) device, a Dynamic Random Access Memory (DRAM) device. Alternatively, other types of memory storage devices such as flash memory, tape, CD ROM, or DVD may be used.

Referring still to FIG. 2, connection mechanism 21 is coupled to microprocessor 20 and is adapted to connect to external devices such as, for example external computers. This allows for easily and quickly downloading new programs for operation on microprocessor 20 and allows for updating direction program 22. Connection mechanism 21 also allows data to be downloaded from SATPOS 3 to an external computer system. In one embodiment, connection mechanism 21 is a connector that complies with the RS-232 standard.

With reference again to FIG. 2, display device 28 is also electrically coupled to microprocessor 20. In one embodiment, display device 20 is an active matrix liquid crystal display. Alternatively a cathode ray tube, or other display device suitable for creating graphic images and alphanumeric characters recognizable to the user can be used.

Input device 27 is coupled to microprocessor 20 and allows for coupling user input to microprocessor 20. In the present embodiment, input device 27 includes function keys and an alphanumeric keypad. Alternatively, input device 27 includes a trackball, mouse, touch pad, joystick. The present invention is also well suited to receiving user input by other means such as, for example, voice commands.

Referring now to FIG. 3, an embodiment of position and direction system 200 is shown that is incorporated into housing 30 that is small enough to hold in a user's hand. In the present embodiment, function keys 32 and alphanumeric keypad 33 allow for coupling user input to position and direction system 200. In one embodiment, one or more of function keys 32 operates as a cursor control device. That is, one or more of function keys 32 allows the computer user to dynamically signal the two-dimensional movement of a visible symbol (cursor) on the display screen of display device 28.

Figure 4:
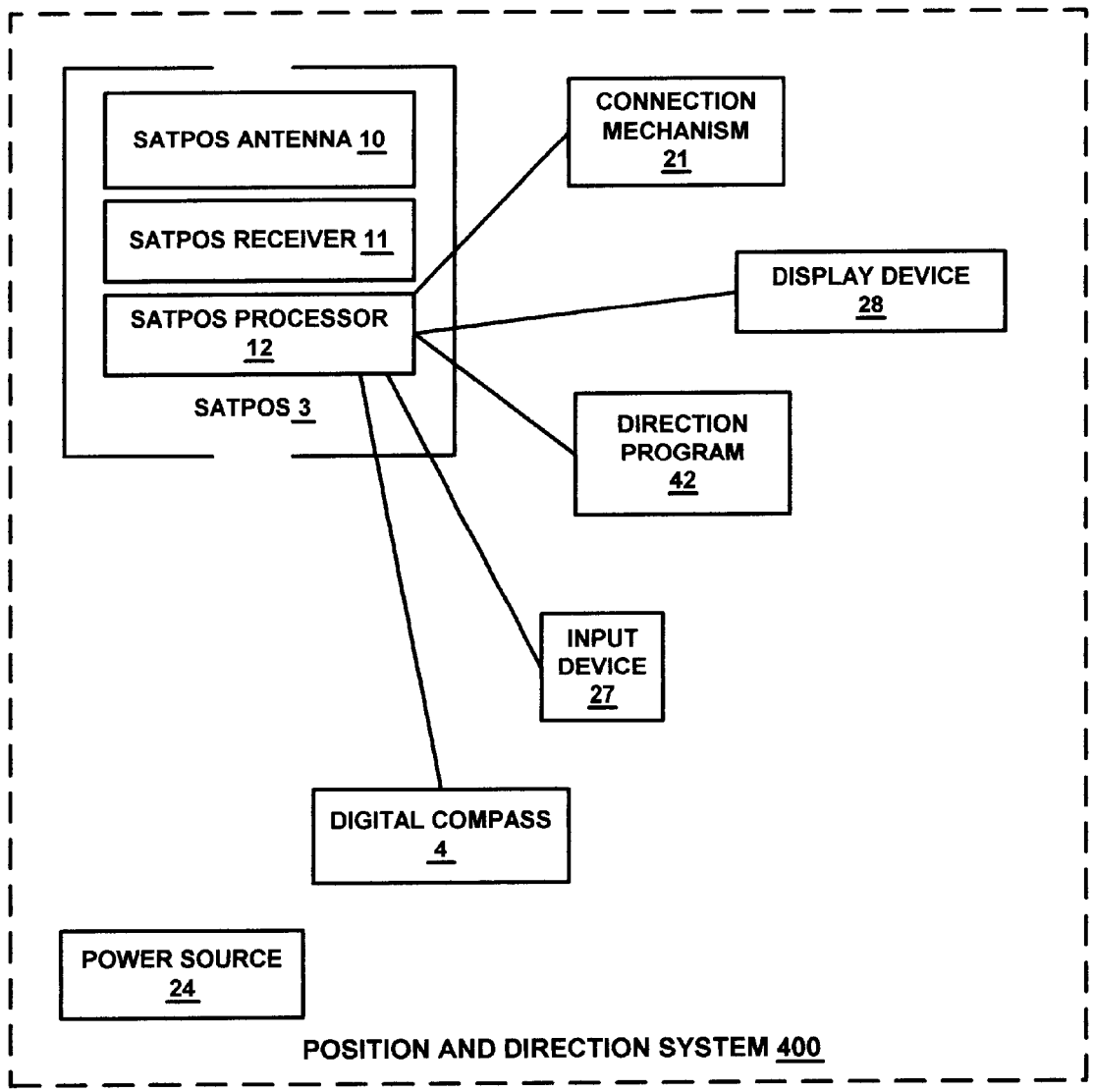
FIG. 4 is a diagram of a position and direction system in accordance with one embodiment of the present invention.

FIG. 4 shows an embodiment of the present invention in which SATPOS processor 12 is used for controlling the operations of the integrated position and direction system 400. Because SATPOS processor 12 is used for controlling the operations of integrated position and direction system 400, there is no need for a second microprocessor such as microprocessor 20 of FIG. 2.

In the embodiment shown in FIG. 4, SATPOS processor 12 is operable to determine position and heading using SATPOS signals and is also operable to receive direction determined by digital compass 4. In this embodiment, SATPOS processor 12 includes instructions for determining which source of direction signals (heading from SATPOS signals or direction determined by digital compass 4) is to be indicated (e.g., displayed) on display device 28. In the present embodiment, these instructions are contained in direction program 42 that controls the operations of integrated position and direction system 400. Direction program 42 is a computer program that is operable on SATPOS processor 12. However, alternatively, instructions necessary for the operation of integrated position and direction system 400 can be implemented on an ASIC, a FPGA, or similar device.

In the present embodiment, position is indicated on display device 28. In one embodiment, position is indicated alphanumerically using latitude and longitude. Alternatively, position is indicated by an icon displayed on a moving map display.

In the present embodiment, reference to a satellite position determination system, or "SATPOS" herein, refers to a Global Positioning System (GPS), to a Global Orbiting Satellite System (GLONASS), and to any other positioning system, including pseudolites, that provide signals that can be used to determine position. The terms "satellite position determination system" and "SATPOS," as used herein, are intended to include position determination using pseudolites or equivalents of pseudolites, and the terms "satellite position determination system signals" and "SATPOS signals," as used herein, are intended to include position determination system-like signals and data from pseudolites or equivalents of pseudolites. Also, signals from other sources such as LORAN, Wide Area Augmentation System (WAAS) satellites, etc., may be used to determine position.

In the embodiments shown in FIGS. 1–4, digital compass 4 is used to determine direction. In the present embodiment, digital compass 4 is a compass that determines direction by detection of electromagnetic flux. In the present embodiment, digital compass 4 is a magnetic field sensor made by Honeywell, Inc. Any of a number of different types of commercially available digital compasses can be used.

Figure 11:
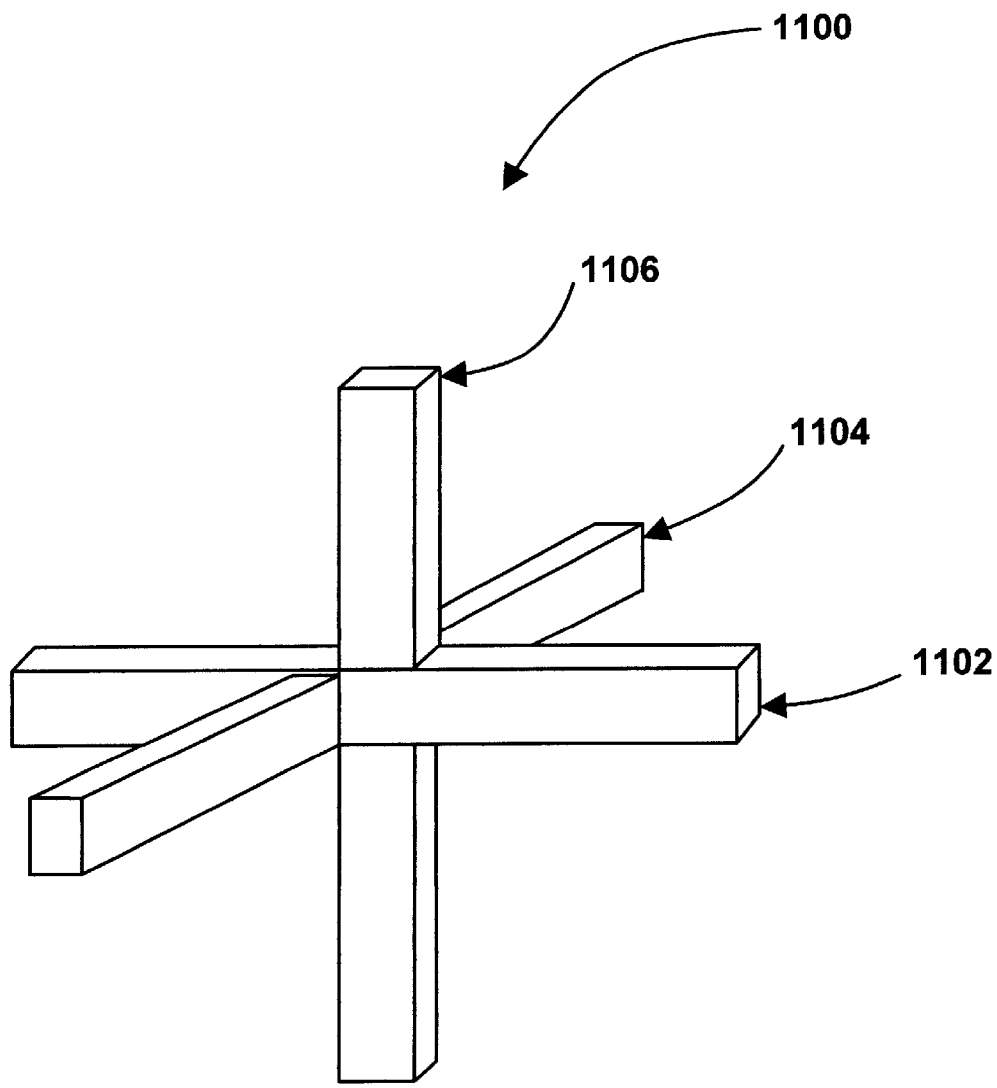
FIG. 11 is a schematic representation of an exemplary configuration for a 3-Sensor magnetic sensor in accordance with one embodiment of the present invention.

Referring now to FIG. 11, a schematic representation of a magnetic field sensor 1100 in accordance with one embodiment of the present invention is shown. In this embodiment, magnetic field sensor 1100 is comprised, in part, of three sensors 1102, 1104, and 1106. By having three sensors, magnetic field sensor 1100 is able to determine the elevation angle of integrated position and direction system 100 of FIG. 1. More specifically, in one embodiment, sensors 1102 (x-direction sensor) and 1104 (y-direction sensor) determine the azimuthal orientation of integrated position and direction system 100. However, the determination of azimuthal orientation will determined with the assumption that integrated position and direction system 100 is held level. Thus, if, for example, a user of integrated position and direction system 100 is walking up a steep hill, walking down a steep hill, holding the integrated position and direction system 100 in a vertically oriented manner, and the like, the accuracy of the determined azimuthal orientation may be severely compromised. By using magnetic field sensor 1100 which includes sensor 1106 (z-direction sensor), the present embodiment is able to correctly determine the azimuthal orientation of integrated position and direction system 100 by correcting for any variation from horizontal in the position of integrated position and direction system 100. That is, sensor 1106 of the present embodiment determines the variance in integrated position and direction system 100 from a truly horizontal position. It will be understood that in the representation of FIG. 11, when integrated position and direction system 100 is at a truly horizontal position, sensor 1106 will be vertically oriented. Although a specific schematic implementation is shown in FIG. 11, the present invention is well suited to use with any of a number of different types of commercially available digital compasses which compensate for variations from a horizontal orientation.

Referring still to FIG. 11, in one embodiment, in addition to correcting the determined azimuthal orientation of integrated position and direction system 100 for variance from a truly horizontal orientation, the present invention also determines (and optionally displays) the elevation angle of integrated position and direction system 100. In such an embodiment, the user is made aware not only of the accurate azimuthal orientation (i.e. the direction in which integrated position and direction system 100 is pointed), but the user is also informed of the elevation angle at which integrated position and direction system 100 is oriented. Hence, the user can determine, for example, the slope of a hill by holding integrated position and direction system 100 parallel to the surface of the hill and reading the determined elevation angle. Additionally, although magnetic field sensor 1100 is comprised, in part, of three orthogonally oriented sensors 1102, 1104, and 1106 in the present embodiment, the present invention is also well suited to an embodiment in which more than three sensors are used and to an embodiment in which the plurality of sensors are arranged other than orthogonally.

Figure 5:
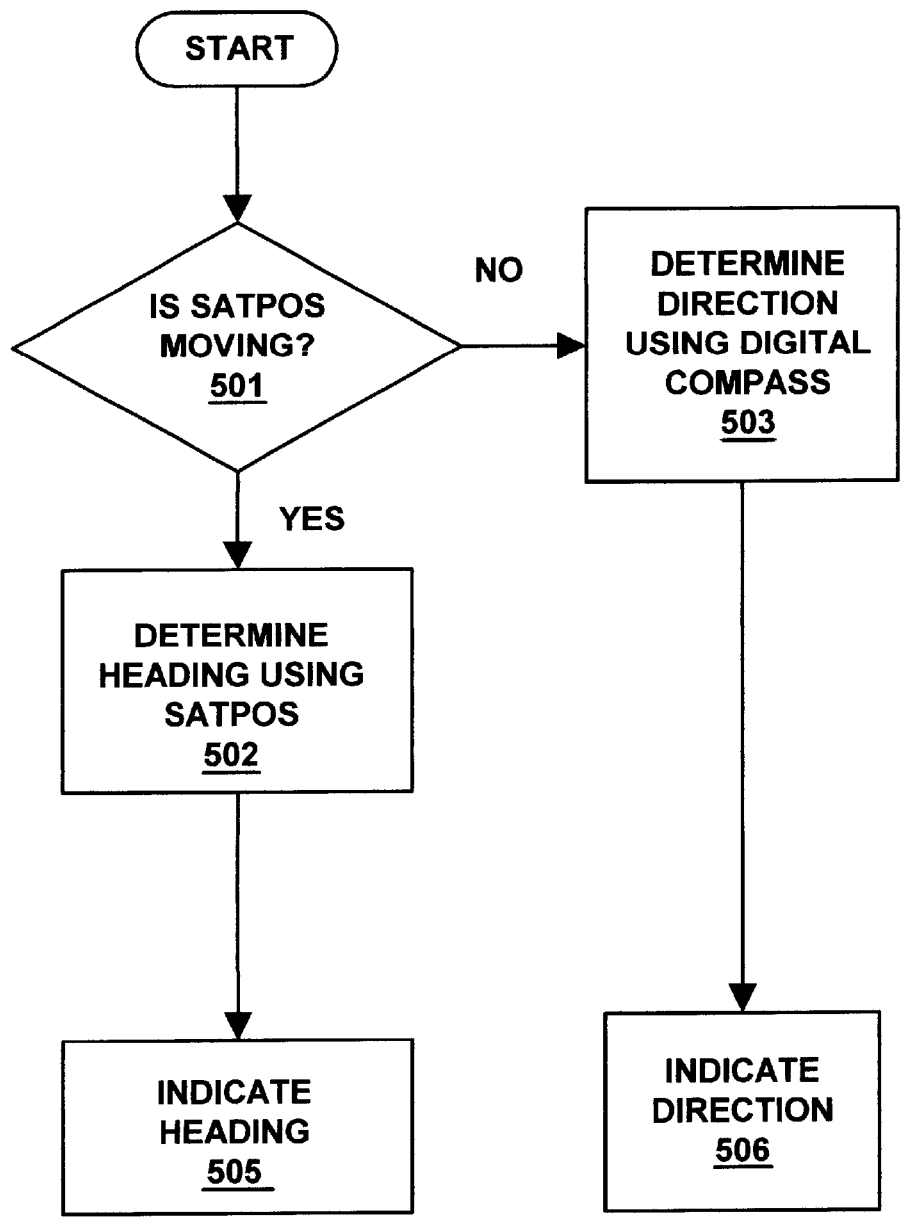
FIG. 5 is a flow chart illustrating a method for indicating direction and heading in accordance with one embodiment of the present invention.

FIG. 5 shows a method for indicating direction and heading according to one embodiment of the present invention. As shown by steps 501–502, when the SATPOS is moving, heading is determined using the SATPOS. In the present embodiment, a satellite positioning system including a receiver adapted to receive satellite position determining signals such as, for example, SATPOS 3 of FIGS. 1–4 is used to both determine whether the SATPOS is moving and to determine heading.

In one embodiment of the present invention, the determination of whether the SATPOS is moving (step 501) is made by comparing the velocity of movement to a threshold velocity. In the present embodiment, prior determinations of position are compared to the most recent determination of position, along with the time of each determination of position to determine the velocity of movement of the SATPOS. When the velocity is determined to be greater than the threshold velocity, the SATPOS is considered to be moving.

As shown by step 505 of FIG. 5, when the SATPOS is moving, heading is indicated using the heading determined in step 502. In the embodiment shown in FIG. 1, display device 2 is used to indicate heading; and in the embodiment shown in FIGS. 2–3, display device 28 is used to indicate heading.

Still referring to FIG. 5, when the SATPOS is not moving, as shown by steps 501 and 503, direction is determined using the digital compass. In the present embodiment, digital compass 4 of FIGS. 1–4 is used for determining direction.

As shown by step 506 of FIG. 5, when the SATPOS is not moving, direction is indicated using the direction determined by the digital compass in step 503. In the embodiment shown in FIG. 1, display device 2 is used to indicate direction; and in the embodiment shown in FIGS. 2–3, display device 28 is used to indicate direction.

The indications of direction and heading steps 505–506 can take any of a number of different forms. In one embodiment, heading and direction are indicated using a displayed compass rose. That is, icons representing a compass rose are displayed on, for example, display device 2 of FIG. 1 or display device 28 of FIGS. 2–3.

Figure 6A:
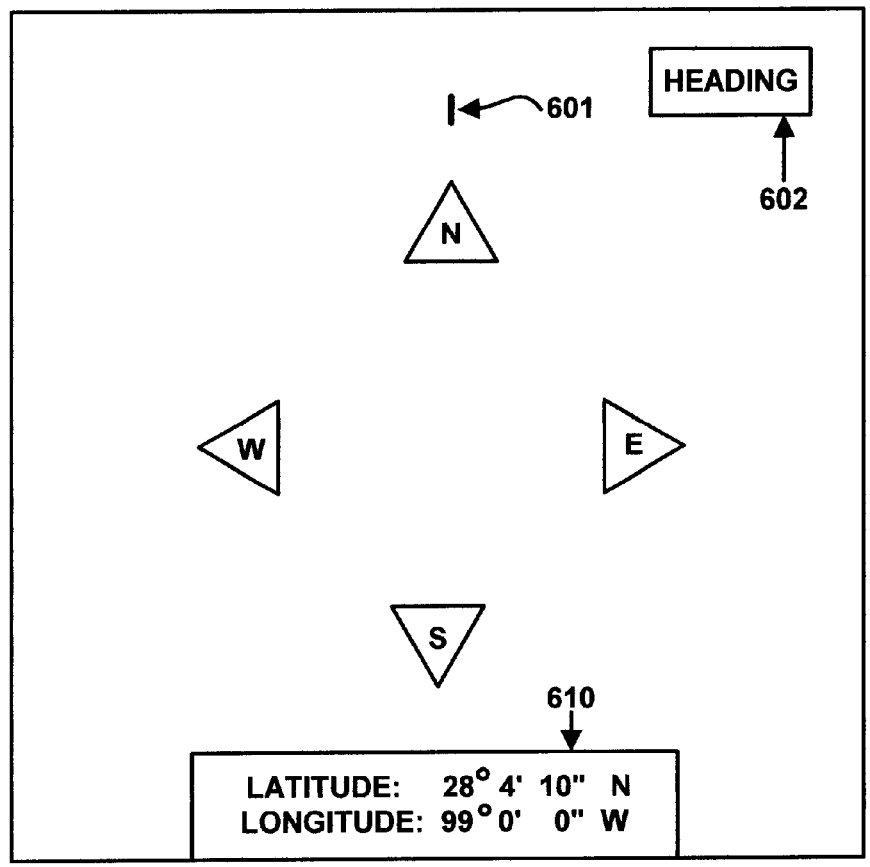
FIG. 6A is a diagram showing an exemplary display that indicates position and heading in accordance with one embodiment of the present invention.
Figure 6B:
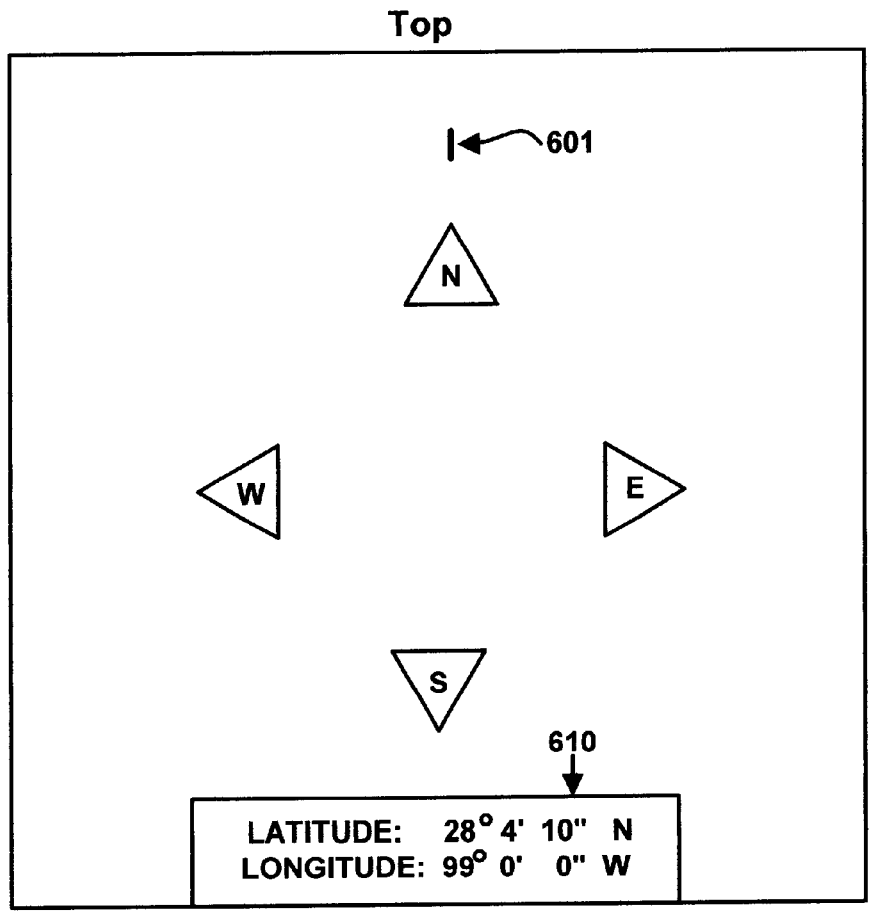
FIG. 6B is a diagram showing an exemplary display that indicates position and direction in accordance with one embodiment of the present invention.

In one embodiment of the present invention the direction and heading indicated in steps 505–506 are indicated using a four-point compass rose. That is, direction is indicated relative to the compass points of North (N), South (S), East (E), and West (W). FIGS. 6A-6B show exemplary displays 600a–600b that include a four-point compass rose that can be used to indicate either heading (step 505 of FIG. 5) or direction (step 506 of FIG. 5).

Referring now to FIGS. 6A–6B, in the present embodiment, an icon is used to indicate whether heading is being displayed or whether direction is being displayed. More particularly, in display 600a of FIG. 6A, icon 602 is displayed to indicate to the user that heading is being displayed. Referring now to FIG. 6B, display 600b indicates that direction is being displayed. That is, the absence of icon 602 of FIG. 6A indicates that the digital compass is being used and that direction is being displayed.

In the embodiments shown in FIGS. 6A–6B, the compass rose is displayed such that direction and heading are indicated relative to alignment mark 601. That is, the compass rose is rotated such that the proper direction or heading is always indicated by reference to alignment mark 601. Thus, in the embodiment shown in FIG. 6A, because the compass point of N is aligned with alignment mark 601, display 600a indicates that the SATPOS has a heading directly to the North. Similarly, in the embodiment shown in FIG. 6B, because the compass point of N is aligned with alignment mark 601, display 600b indicates a North direction. That is, the SATPOS is oriented such that alignment mark 601 is pointing directly to the North.

Figure 7A:
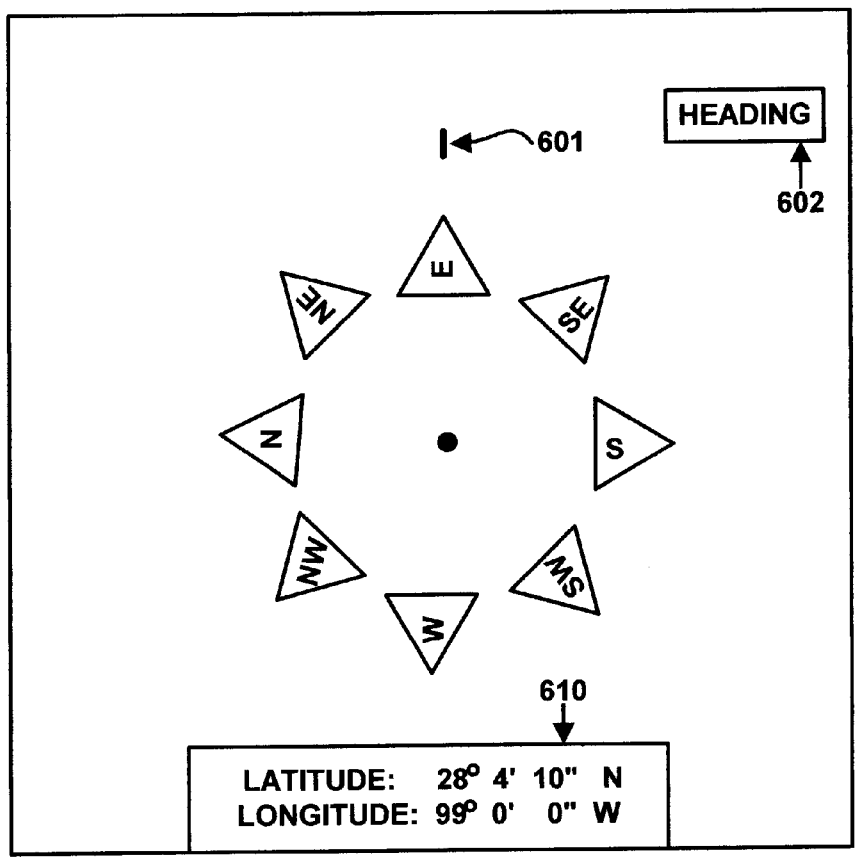
FIG. 7A is a diagram showing an exemplary display that indicates position and heading in accordance with one embodiment of the present invention.
Figure 7B:
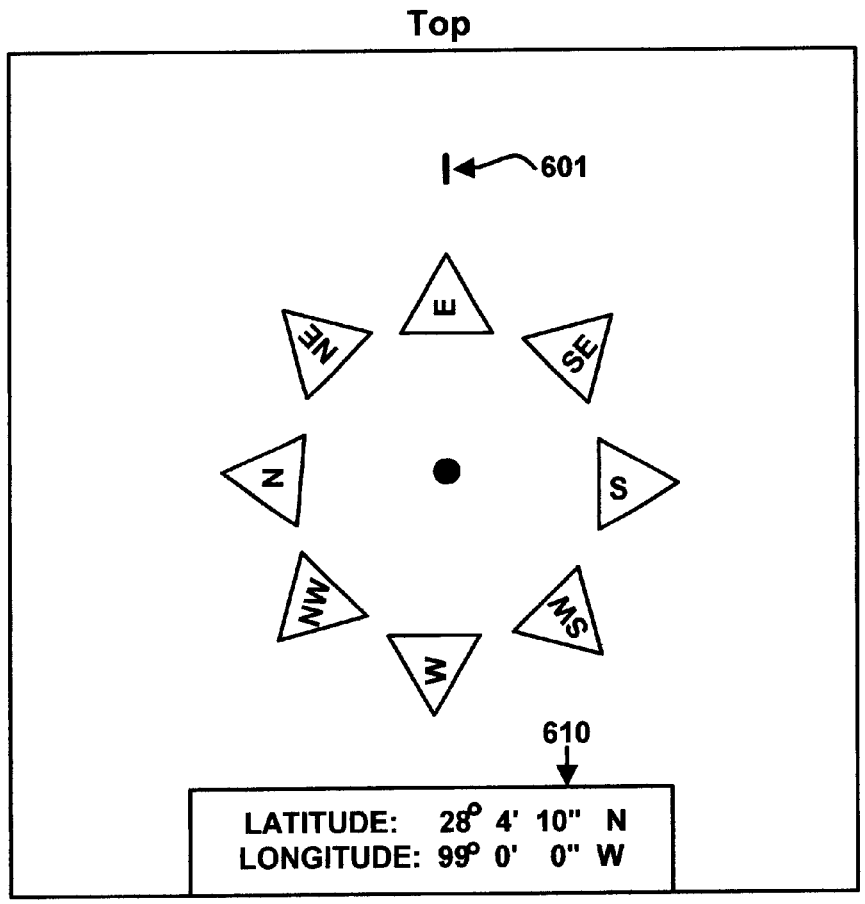
FIG. 7B is a diagram showing an exemplary display that indicates position and direction in accordance with one embodiment of the present invention.

FIGS. 7A–7B show an embodiment in which direction and heading are indicated using an eight-point compass rose. That is, direction and heading are indicated relative to the compass points of North (N), South (S), East (E), West (W), North East (NE), South East (SE), South West (SW), and North West (NW).

Referring now to FIGS. 7A–7B, exemplary displays 700a and 700b are shown to include an eight-point compass rose that can be used to indicate either heading (step 505 of FIG. 5) or direction (step 506 of FIG. 5). As in the embodiment shown in FIGS. 6A–6B, direction and heading are indicated relative to alignment mark 601 and icon 602 indicates whether direction or heading is being displayed.

In the embodiment shown in FIG. 7A, because the compass point of E is aligned with alignment mark 601, and because icon 602 is displayed, display 700a indicates that the SATPOS has a heading directly to the East. Similarly, in the embodiment shown in FIG. 7B, because the compass point of E is aligned with alignment mark 601, and because icon 602 is not displayed, display 700b indicates a East direction. That is, the SATPOS is oriented such that the top of the display, as indicated by alignment mark 601, is pointing directly to the East.

Figure 8A:
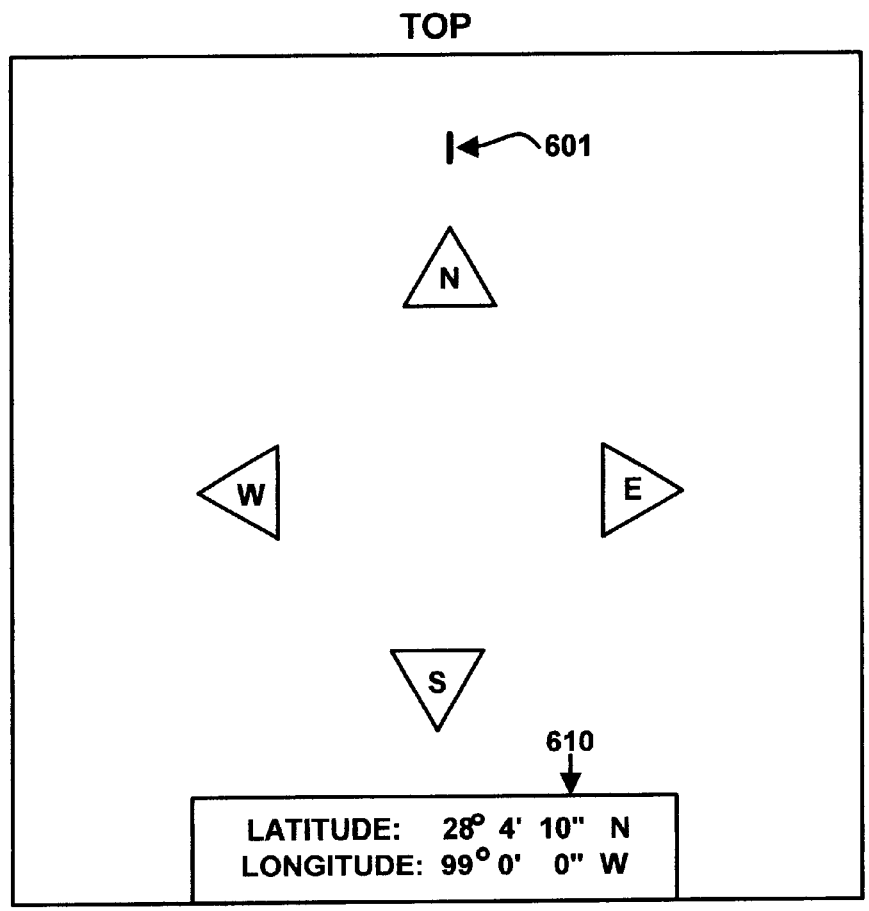
FIG. 8A is a diagram showing an exemplary display that indicates position and heading in accordance with one embodiment of the present invention.
Figure 8B:
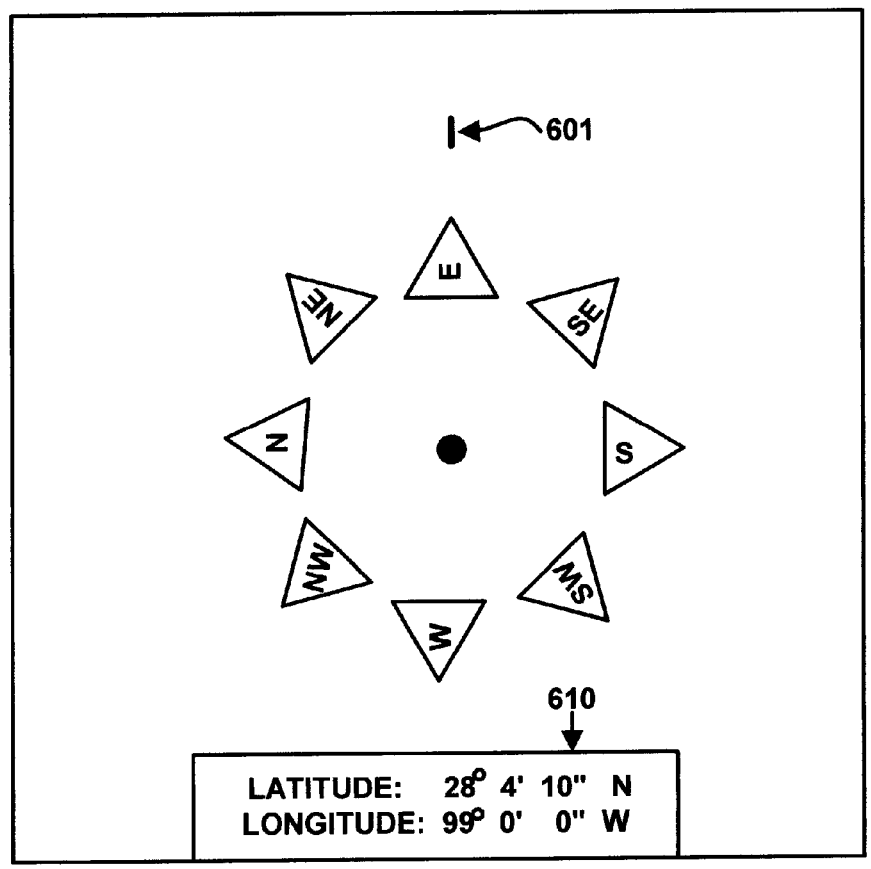
FIG. 8B is a diagram showing an exemplary display that indicates position and direction in accordance with one embodiment of the present invention.

FIGS. 8A–8B show an embodiment in which both a four-point compass rose and an eight-point compass rose are used. In the present embodiment, the display of a four-point compass rose indicates that heading (step 505 of FIG. 5) is being displayed while the display of an eight-point compass rose indicates that direction (step 506 of FIG. 5) is being displayed. In the embodiment shown in FIGS. 8A–8B, direction and heading are indicated relative to the top of the display, as indicated by alignment mark 601.

Now referring to display 800a of FIG. 8A, because the compass point of E is aligned with alignment mark 601, and because a four-point compass rose is displayed, display 800a indicates that the SATPOS has a heading directly to the East. Similarly, in the embodiment shown in FIG. 8B, because the compass point of E is aligned with alignment mark 601, and because an eight-point compass rose is displayed, display 800b indicates a East direction. That is, the SATPOS is oriented such that the top of the display, as indicated by alignment mark 601 is pointing in the cardinal direction of East.

The apparatus and method of the present invention automatically switches between displays of heading and direction as the SATPOS moves and stops moving. Thus, the method and apparatus of the present invention provide an uninterrupted display that can be used to find features, waypoints, etc. In the present embodiment, either heading or direction is continually displayed.

In the present embodiment, the determined position is also indicated. In the embodiments shown in FIGS. 6A–8B, position is indicated alphanumerically using latitude and longitude as shown by icon 610. Alternatively, position is indicated by an icon displayed on a moving map display.

Figure 9A:
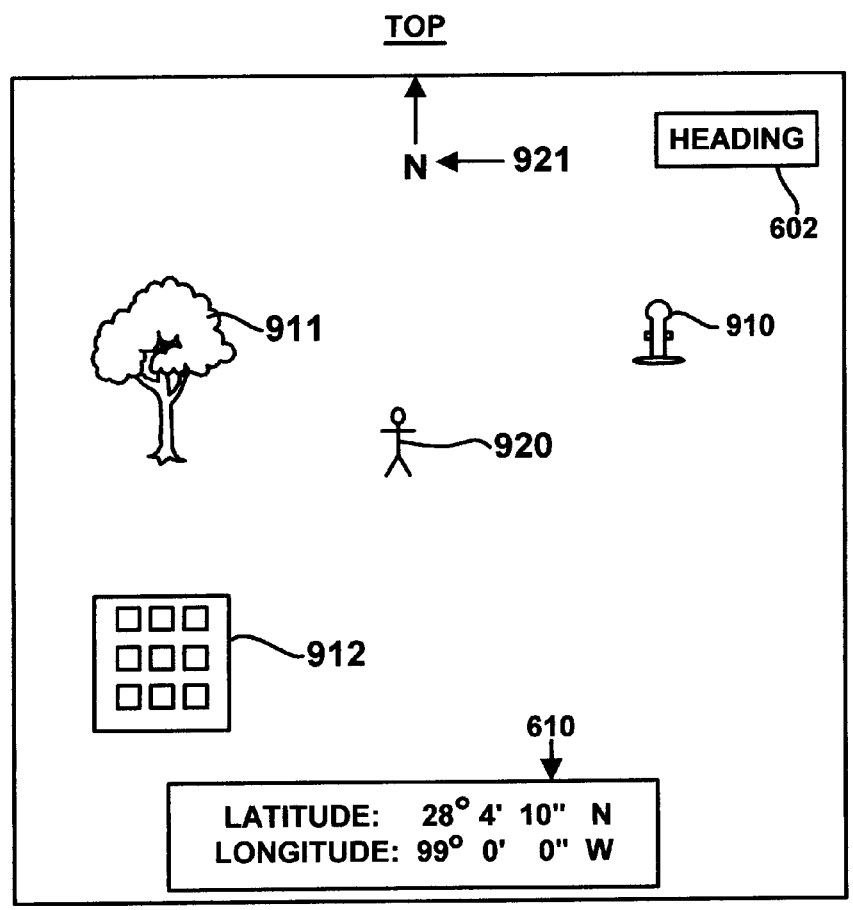
FIG. 9A is a diagram showing an exemplary display that indicates position and heading in accordance with one embodiment of the present invention.
Figure 9B:
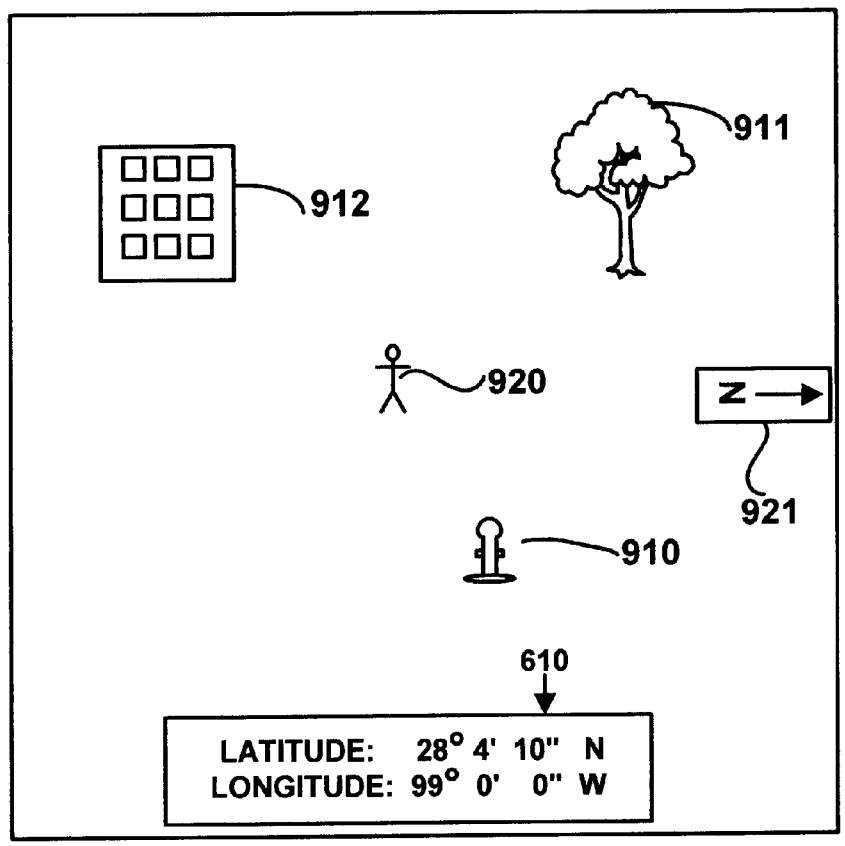
FIG. 9B is a diagram showing an exemplary display that indicates position and direction in accordance with one embodiment of the present invention.

In one embodiment of the present invention, position, direction and heading are indicated using a moving map display. FIGS. 9A–9B show exemplary displays 900a and 900b, respectively, that include position icon 920 that indicates the position of the SATPOS relative to icons 910–912 that represent features. In the present embodiment, icon 910 indicates the position of a feature that is a fire hydrant, icon 911 indicates the position of a feature that is a tree, and icon 912 indicates the position of a feature that is a building.

Referring now to FIGS. 9A–9B, exemplary displays 900a and 900b are shown to include position icon 920 that indicates the position of the SATPOS relative to features 910–912. As in the embodiment shown in FIGS. 6A–7B, an icon 602 is displayed to indicate whether direction or heading is being displayed. In the present embodiment, an icon 921 that indicates the direction of North is also displayed so that the user can determine the orientation of the moving map display.

Referring now to FIG. 9A, an exemplary display 900a is shown that indicates a heading of North. That is, because heading icon 602 is displayed, a display of heading is indicated (step 505 of FIG. 5). Because the map is oriented such that the North icon is pointed to the top of the display, the heading is indicated as being directly to the North.

Referring now to FIG. 9B, an exemplary display 900b is shown that indicates a direction of West. That is, because heading icon 602 is not displayed, a display of direction is indicated (step 506 of FIG. 5). Because the map is oriented such that the North icon is pointed to the right side of the display, the direction is indicated as being directly to the West. That is, the display is oriented such that the top of the display points in the cardinal direction of West.

The apparatus and method of the present invention automatically switches between displays of heading and direction as the SATPOS moves and stops moving. Thus, the method and apparatus of the present invention provide an uninterrupted display that can be used to find features such as, for example, features 910–912 of displays 900a–900b.

The present invention is well adapted for other indications of heading and direction other than those shown in FIGS. 6A–9B. In one embodiment, heading and/or direction are indicated using an indication of degrees from 0 to 360 degrees. That is, a number is displayed on the display device that indicates cardinal direction with 0 and 360 being North. That is, in the embodiment shown in FIG. 1, display device 2 displays a number from 0 to 360; and in the embodiment shown in FIGS. 2–3, display device 28 displays a number from 0 to 360.

The embodiments shown in FIGS. 1–9B of the present invention provide a method and apparatus for providing an accurate indication of direction and heading to a user of a SATPOS device. When the user is stationary, position is accurately indicated using a digital compass. When the user is moving, the direction of movement (heading) is accurately indicated. Because the integrated position and direction system of the present invention always indicates either heading or direction, the user is always able to locate features, waypoints, etc.

Prior art digital compasses are typically calibrated manually by rotating the digital compass in a circular arc. The digital compass of the present invention can be manually calibrated using this technique.

In one embodiment of the present invention, the digital compass is automatically calibrated using the SATPOS determination of heading. In one embodiment of the present invention, the digital compass is automatically calibrated upon selection of an icon or button that indicates "Automatic Compass Calibration" when the position and direction system of the present invention is moving (e.g., when step 501 of FIG. 5 indicates that the SATPOS is moving).

In one embodiment of the present invention, the digital compass is automatically calibrated on a periodic basis, without any required input from the operator, when the SATPOS is moving. In one embodiment, the digital compass is automatically calibrated according to user selectable time periods. In the present embodiment, the user can select time periods of ten minutes, 30 minutes, one hour, four hours, or 12 hours. Thus, for example, when a user selects a time period of ten minutes, the digital compass is calibrated when the digital compass begins to move and every ten minutes thereafter until the digital compass stops moving. This provides for easily maintaining the accuracy of the digital compass.

In the present embodiment, the digital compass is calibrated by determining heading using the SATPOS, and adjusting the direction indicated by the digital compass according to the heading determined by the satellite positioning system. In the embodiment shown in FIG. 1, controller 1 is operable to automatically calibrate the digital compass; in the embodiment shown in FIGS. 2–3, direction program 22 is operable to automatically calibrate the digital compass; and in the embodiment shown in FIG. 4, direction program 42 is operable to automatically calibrate the digital compass.

Figure 10:
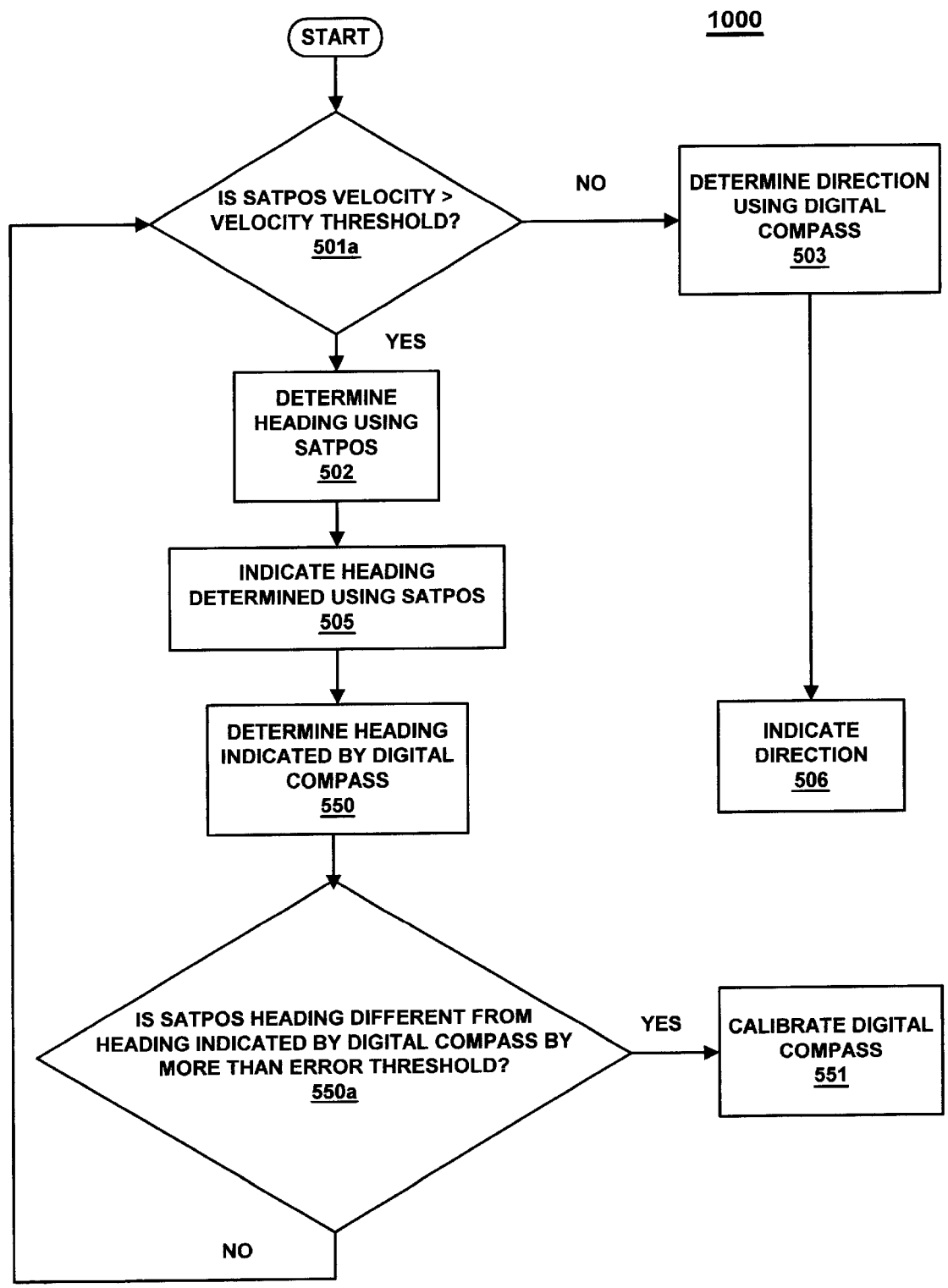
FIG. 10 is a flowchart illustrating a method for calibrating a digital compass in accordance with one embodiment of the present invention.

FIG. 10 shows a method for calibrating a digital compass 1000 in which a digital compass (e.g., digital compass 4 of FIGS. 1–4) is calibrated using a heading determined using a SATPOS (e.g., SATPOS 3 of FIGS. 1–4). Referring now to step 501a, the velocity determined by the SATPOS is compared to a threshold velocity. If the velocity is not greater than the threshold velocity (steps 501a and 503), direction is determined using the digital compass(step 503), and direction is indicated as shown by step 506.

Continuing with FIG. 10, if the velocity is not greater than the threshold velocity, heading is determined using the SATPOS as shown by steps 501*a* and 502. The heading determined using the SATPOS is then indicated as shown by step 505.

Still referring to FIG. 10, as shown by step 550, the heading indicated by the digital compass is determined. In the embodiment shown in FIG. 1, controller 1 is operable to determine the heading indicated by the digital compass using input from digital compass 4; in the embodiment shown in FIGS. 2–3, direction program 22 is operable to determine the heading indicated by the digital compass; and in the embodiment shown in FIG. 4, direction program 42 is operable to determine the heading indicated by the digital compass.

The heading indicated by the digital compass is then compared to the heading determined using the SATPOS as shown by step 550*a*. If the difference between the heading determined using the SATPOS and the heading indicated by the digital compass is more than a predetermined error threshold, the digital compass is calibrated as shown by step 551. In one embodiment, a default error threshold of between one to two percent is initially used, which can be altered by the user at any time to accommodate the needs of that particular user. The present embodiment allows for the automatic calibration of the digital compass whenever the heading indicated by the digital compass significantly varies from the heading determined using the SATPOS.

As discussed above, the present invention provides for automatically calibrating a digital compass, either as a result of user input (e.g., selection of an icon, pressing of a button, etc.), or as a result of user-defined criteria for automatic calibration. That is, the user can program the present invention to automatically calibrate the digital compass (e.g., when velocity exceeds a given threshold, whenever the SATPOS begins moving, periodically while the SATPOS is moving, when the difference between the SATPOS determined heading differs from the heading indicated by the digital compass by more than a predetermined threshold, etc.). The integrated position and direction system of the present invention is easy to use since there in no need for a user to manually calibrate the digital compass.

Though the embodiments shown in FIGS. 1–9B describe the indication of either direction or heading, the present invention is well adapted for display of both direction and heading when the SATPOS is moving.

AUTOMATIC CHARTING OF OBSTRUCTIONS FOR MISSION PLANNING

Figure 12A:
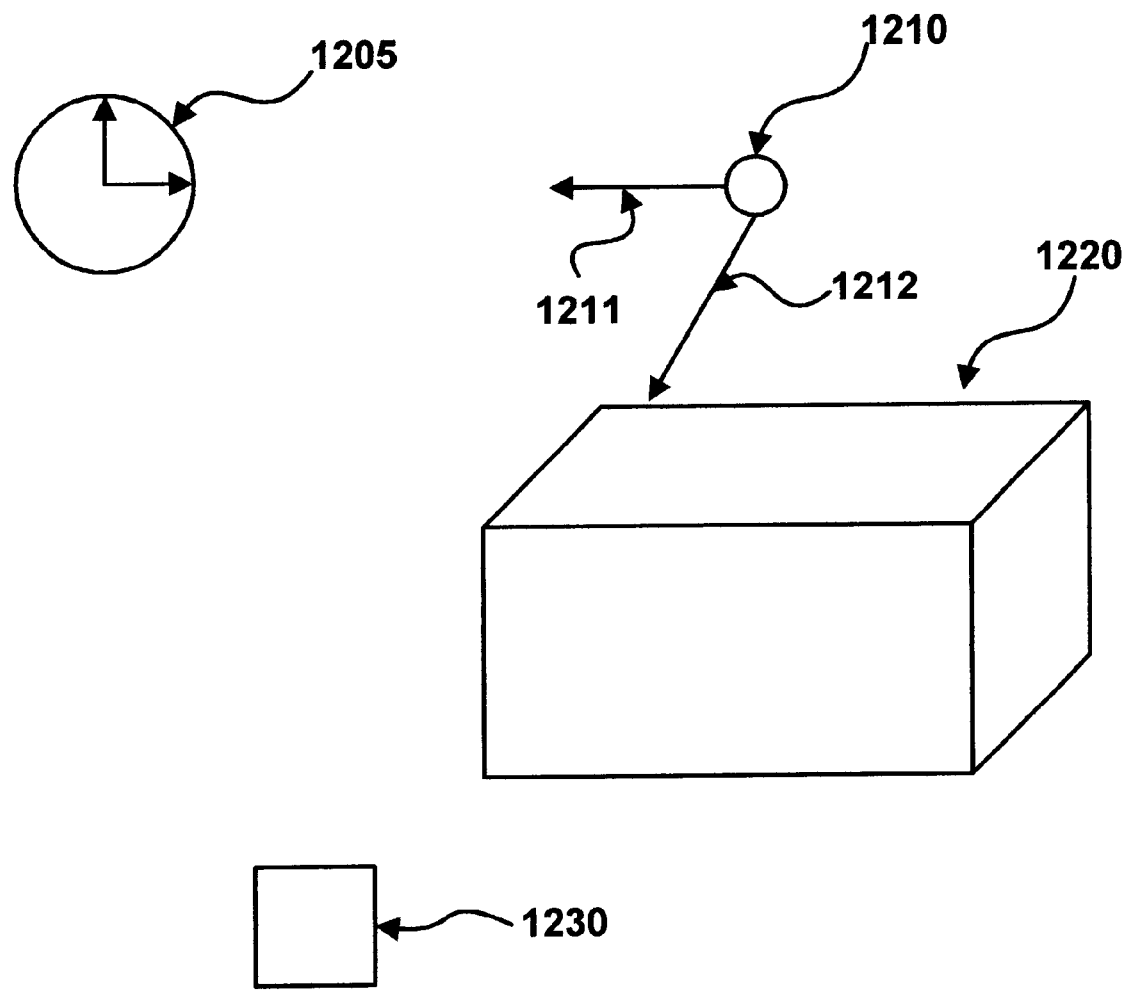
FIGS. 12A and 12B are illustrations showing the time-dependence associated with receiving a broadcast signal in accordance with one embodiment of the present invention.
Figure 12B:
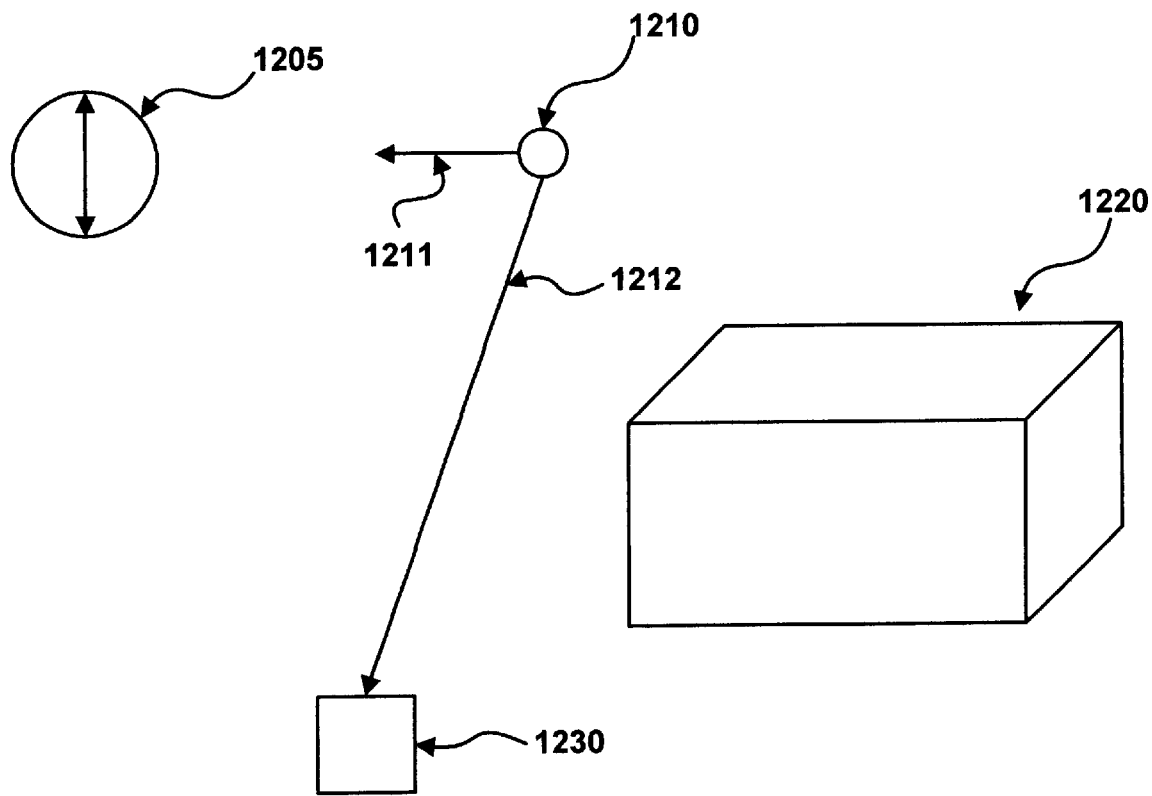

FIGS. 12A and 12B are illustrations showing the time-dependence associated with receiving a broadcast signal 1212 in accordance with one embodiment of the present invention, in which the broadcasting device 1210 is moving in a direction 1211 relative to the receiving device 1230. In one embodiment, broadcasting device 1210 is a device in a positioning system, such as a satellite in a satellite position determination system including GPS, GLONASS, LORAN, and WAAS. In one embodiment, receiving device 1230 is a SATPOS device, such as the SATPOS embodiments of FIGS. 1–4. It is appreciated the present invention is well-suited to other types of broadcasting and receiving devices and to applications in which the broadcasting device and the receiving device are in motion relative to each other.

With reference to FIG. 12A, broadcast signal 1212 is obstructed by an object 1220 and therefore cannot be received by receiving device 1230 (that is, the broadcasting device cannot be "viewed" by the receiving device). Object 1220 represents any type of object or physical feature that may block broadcast signal 1212. For example, object 1220 represents a building, a hill, a tree, a canyon wall, etc. A clock 1205 is used to represent the passage of time from the scene illustrated in FIG. 12A to the scene illustrated in FIG. 12B.

With reference to FIG. 12B, with the passage of time, broadcasting device 1210 moves to a position in which broadcast signal 1212 can be received by receiving device 1230. It is appreciated that there may be multiple broadcasting devices, each on different paths, and that at various times any number and combination of broadcasting devices may be viewable by receiving device 1230 as their respective paths cause them to move behind and out from behind object 1220.

In one embodiment, in which broadcasting device 1210 is a satellite in a satellite position determination system, the satellite's position can be uniquely predicted from the satellite's IODE (issue of data ephemeris). IODE is a term known in the art and refers to a set of parameters that can be used to calculate a satellite's orbit over a given time period.

In accordance with the present invention, the periods of time (e.g., the date and the time of day) in which broadcasting device 1210 is in view of receiving device 1230 are determined for locations of interest. Using information such as IODE information, periods of time in the future when broadcasting device 1210 is in view of receiving device 1230 can be predicted. Similar information can be generated for multiple broadcasting devices, and the information stored in a database. A timetable can be derived that shows, for each location, when a number of broadcasting devices sufficient for accurately determining positioning information (including direction and heading) can be viewed by receiving device 1230. As will be seen, the timetable can be derived using a largely automated process, and thus the present invention is relatively convenient to implement.

In accordance with the present invention, the timetable can be used to devise a schedule for visiting each location of interest at those times when a sufficient number of viewable broadcasting devices are present. As a result, in accordance with the present invention, a user's time is not wasted by traveling to a location only to find that a signal cannot be received from a sufficient number of broadcasting devices. In addition, when multiple locations are to be visited, the timetable can be used to develop a schedule that is efficient for gathering positioning information from each site. Thus, in accordance with the present invention, mission planning is conveniently performed, and a user's time is most efficiently used.

Figure 13:
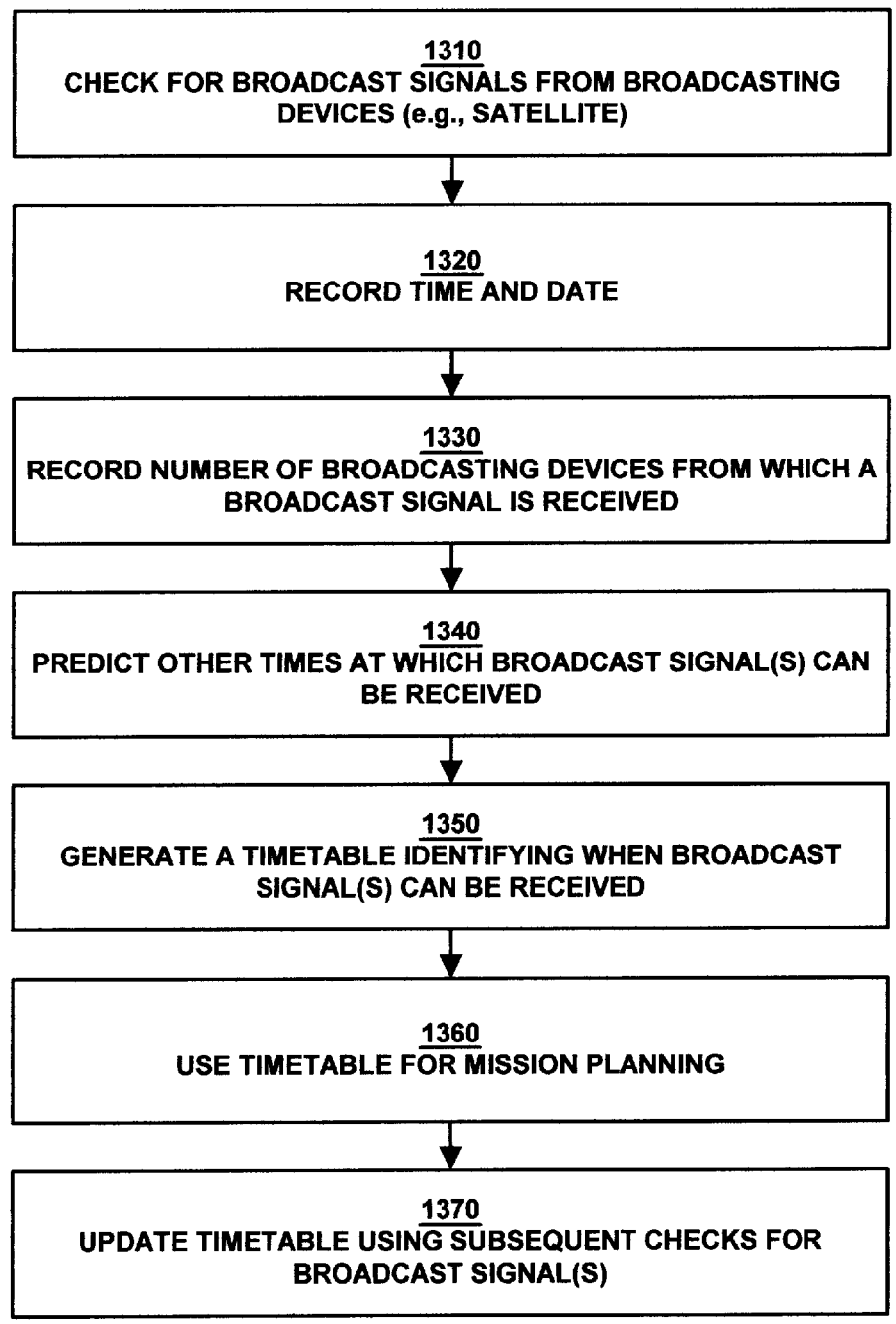
FIG. 13 is a flowchart of the steps in a process for generating and maintaining a location-sensitive timetable in accordance with one embodiment of the present invention.

FIG. 13 is a flowchart of the steps in a process 1300 for generating and maintaining a location-sensitive timetable in accordance with one embodiment of the present invention. Process 1300 can be performed for multiple locations of interest, with the results from each location then integrated into the timetable of the present invention.

With reference also to FIGS. 12A and 12B, in step 1310 of FIG. 13, receiving device 1230 is used to check for broadcast signals 1212 from each of a plurality of broadcasting devices exemplified by broadcasting device 1210. In one embodiment, receiving device 1230 is a SATPOS device having a receiver 11 (see FIGS. 2 and 4, for example). Receiving device 1230 can check for broadcast signal2 1212 in various ways. For example, receiving device 1230 can scan a range of broadcast frequencies, listening for a signals within that range. Alternatively, receiving device 1230 can tune to one or more broadcast frequencies known to carry a broadcast signal 1212.

In step 1320 of FIG. 13, in the present embodiment, the time (e.g., time of day and the date) at which step 1310 is being performed is recorded by receiving device 1230. In one embodiment, receiving device 1230 is a SATPOS device having a data storage device 25 (FIG. 2, for example).

In step 1330 of FIG. 13, in the present embodiment, the number of broadcasting devices 1210 from which a broadcast signal 1212 is received as a result of step 1310 is recorded by receiving device 1230. In a GPS embodiment, for example, at any one time there are typically four satellites from which broadcast signals should be received (if the broadcast signals are not obstructed from reaching the receiving device). In this embodiment, a number less than or equal to four (including zero) would be recorded by receiving device 1230.

In one embodiment, receiving device 1230 also records a unique identifier for each broadcasting device from which a broadcast signal is received. In the GPS embodiment (as well as similar embodiments), the position of each satellite is known, so it is also possible to deduce the identity of satellites from which a broadcast signal should have been received but was not.

In step 1340 of FIG. 13, based on the information recorded in steps 1320 and 1330, a prediction can be made of future times and dates in which broadcast signals can and cannot be received. For example, in the GPS embodiment, the IODE information can be used to predict the times in the future when the satellites will be in the same positions as they were when steps 1320 and 1330 were performed. Accordingly, it is possible to predict when satellites from which broadcast signals were received will be in their same positions, as well as the times in the future when the satellites from which broadcast signals were not received will also be in their same positions. Thus, it can be predicted when satellites will and will not be viewable, and how many satellites will and will not be viewable, based on the information recorded in steps 1320 and 1330.

In one embodiment, the information recorded in steps 1320 and 1330 is downloaded from receiving device 1230 to a computer system (e.g., computer system 1590 of FIG. 15 below). In this embodiment, computer system 1590 predicts future satellite positions based on that information and the IODE information. In one embodiment, receiving device 1230 is a SATPOS device having a connection mechanism 21 (FIGS. 2 and 4) for connecting to computer system 1590.

In step 1350 of FIG. 13, in the present embodiment, a timetable can be generated containing, for each location checked in step 1310, information regarding the number of broadcast signals that can be received (e.g., the number of broadcasting devices in view of the receiving device) as a function of time and date. In one embodiment, the recorded information (from steps 1320 and 1330) is downloaded to a computer system (e.g., computer system 1590 of FIG. 15) which generates the timetable.

In step 1360 of FIG. 13, the timetable can be integrated into mission planning. That is, using the timetable, a schedule can be derived that identifies when a sufficient number of broadcasting devices are in view at each location. For example, in the GPS embodiment, it is desirable that three satellites are in view in order to obtain accurate positioning information. Accordingly, a schedule can be derived from the timetable showing the times and dates when three satellites will be in view at each of the various locations. A user having to travel to each of the various locations can plan accordingly to be at each location when a number of satellites sufficient for determining accurate positioning information will be in view.

In the present embodiment, the timetable will initially contain information corresponding only to the first time and date at which step 1310 was performed. However, with each visit to a location, additional information regarding the number of broadcasting devices in view at different times and dates will be accumulated and added to the timetable (step 1370). Thus, the timetable will become increasingly populated with information showing, for each location visited, the number of broadcasting devices in view as a function of time and date.

In accordance with the present invention, process 1300 can be an automated process. In the present embodiment, the timetable is automatically generated and updated (step 1350) using the information accumulated in steps 1310–1340 and 1370, and the timetable is automatically factored into mission planning for data maintenance (step 1360). As such, the present invention provides a method and system that are conveniently implemented.

Figure 14:
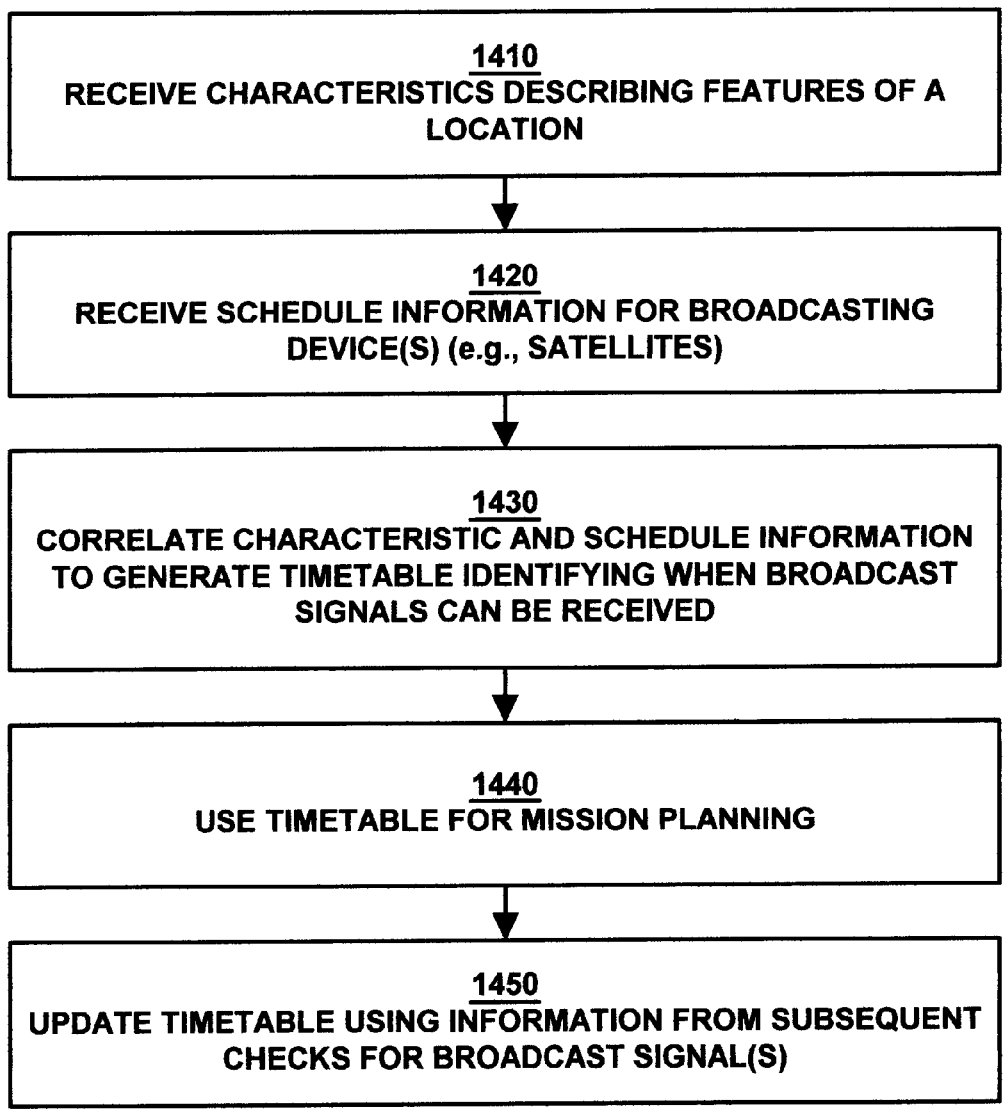
FIG. 14 is a flowchart of the steps in a process for generating and maintaining a location-sensitive timetable in accordance with another embodiment of the present invention.

FIG. 14 is a flowchart of the steps in a process 1400 for generating and maintaining a location-sensitive timetable in accordance with another embodiment of the present invention. Process 1400 can be performed for multiple locations of interest, with the results from each location then integrated into the timetable of the present invention. In one embodiment, process 1400 is executed by computer system 1590 of FIG. 15 below.

In step 1410 of FIG. 14, in the present embodiment, information is received describing the characteristics of the features of each location of interest. With reference also to FIGS. 12A and 12B, for example, information regarding the height and width of object 1220, as well as its position, can be recorded. The expected position of receiving device 1230 can also be recorded. Thus, a virtual map with representations of object 1220 and receiving device 1230 can be created.

In step 1420 of FIG. 14, information can be obtained describing the position of broadcasting device 1210 as a function of time. For example, in the GPS embodiment, satellite constellation information (e.g., IODE information) can be used to calculate a satellite's orbit over a given time period. Thus, the position of broadcasting device 1210 as a function of time can be added to the virtual map.

In step 1430 of FIG. 14, in the present embodiment, a timetable is generated. Using the characteristics and features information from step 1410 with the satellite constellation information from step 1420, the dates and times when satellites will be blocked from view of the receiving device can be deduced and recorded in the timetable. Thus, the timetable shows, for each location, the number of broadcasting devices in view of receiving device 1230 as a function of time and date.

In step 1440 of FIG. 14, the timetable can be integrated into mission planning as described above in conjunction with FIG. 13.

In step 1450 of FIG. 14, the timetable can be updated as additional information becomes available. For example, a user may visit a particular location and record information regarding the number of broadcasting devices in view. This information can be incorporated into the timetable using elements of process 1300 (FIG. 13) described above.

Figure 15:
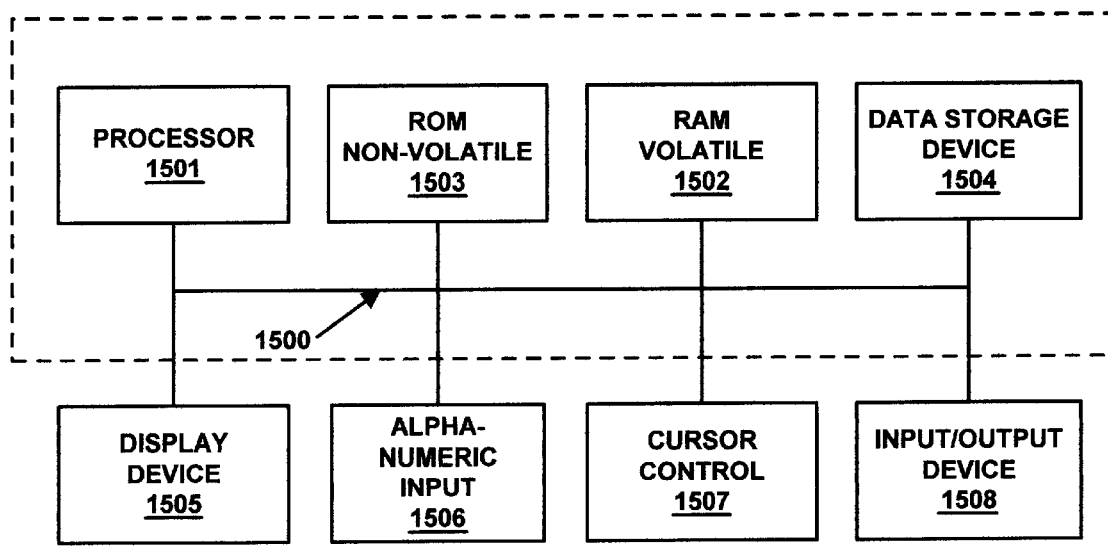
FIG. 15 is a block diagram of an exemplary computer system upon which embodiments of the present invention may be implemented.

Refer now to FIG. 15 which illustrates an exemplary computer system 1590 upon which embodiments of the present invention may be practiced. In general, computer system 1590 comprises bus 1500 for communicating information, processor 1501 coupled with bus 1500 for processing information and instructions, random access (volatile) memory (RAM) 1502 coupled with bus 1500 for storing information and instructions for processor 1501, read-only (non-volatile) memory (ROM) 1503 coupled with bus 1500 for storing static information and instructions for processor 1501, data storage device 1504 such as a magnetic or optical disk and disk drive coupled with bus 1500 for storing information and instructions, an optional user output device such as display device 1505 coupled to bus 1500 for displaying information to the computer user, an optional user input device such as alphanumeric input device 1506 including alphanumeric and function keys coupled to bus 1500 for communicating information and command selections to processor 1501, and an optional user input device such as cursor control device 1507 coupled to bus 1500 for communicating user input information and command selections to processor 1501. Furthermore, an optional input/output (I/O) device 1508 is used to exchange data and information with another device, such as integrated position and direction system (receiving device) 1230 of FIGS. 12A and 12B.

Continuing with reference to FIG. 15, display device 1505 utilized with computer system 1590 may be a liquid crystal device, cathode ray tube, or other display device suitable for creating graphic images and alphanumeric characters recognizable to the user. Cursor control device 1507 allows the computer user to dynamically signal the two-dimensional movement of a visible symbol (pointer) on a display screen of display device 1505. Many implementations of the cursor control device are known in the art including a trackball, mouse, joystick or special keys on alphanumeric input device 1506 capable of signaling movement of a given direction or manner of displacement. It is to be appreciated that the cursor control 1507 also may be directed and/or activated via input from the keyboard using special keys and key sequence commands. Alternatively, the cursor may be directed and/or activated via input from a number of specially adapted cursor directing devices.

In summary, the present invention provides a method and apparatus that accurately indicate direction and heading to a user of a satellite positioning system (SATPOS) device. The present invention also provides a method and system for identifying when a sufficient number of satellites can be viewed at various locations so that positioning information can be accurately determined. In one embodiment, a timetable showing for each location the dates and times of day that are and are not satisfactory for obtaining and maintaining positioning information is automatically generated and updated. The timetable can be automatically factored into mission planning for data maintenance by creating a schedule for visiting each location when satellite viewing will be satisfactory, so that a user's time is more efficiently planned for and used. The present invention also provides a method and system that are conveniently implemented.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for generating and maintaining a database comprising a location-sensitive timetable, said method comprising the steps of:
   a) checking for broadcast signals from a plurality of broadcasting devices, said checking performed for multiple locations;
   b) recording a time and date for each said checking;
   c) recording for each said checking a number of said plurality of broadcasting devices from which a broadcast signal can be received, wherein a broadcast signal from a broadcasting device is at times unable to reach a particular location; and
   d) generating said timetable identifying times and dates at which broadcast signals from a necessary number of said plurality of broadcasting devices can be received at each of said multiple locations.

2. The method as recited in claim 1 wherein said plurality of broadcasting devices are devices in a positioning system, wherein said broadcast signals are used for determining a position of a location.

3. The method as recited in claim 2 wherein said checking is performed using an integrated position and direction system comprising:
   a receiver operable to receive said broadcast signals;
   a microprocessor operable to determine position and to determine heading;
   a digital compass operable to determine direction; and
   a display coupled to said microprocessor and to said digital compass, said display operable to indicate said heading and said direction.

4. The method as recited in claim 3 wherein said step a) further comprises the steps of:
   a1) determining a position for each of said multiple locations; and
   a2) correlating said position for each of said multiple locations with said recordings of said steps b) and c).

5. The method as recited in claim 1 wherein said step c) further comprises the step of:
   c1) recording information identifying each of said plurality of broadcasting devices from which a broadcast signal is received.

6. The method as recited in claim 5 wherein said step d) further comprises the step of:
   d1) predicting other times and dates at which broadcast signals from a necessary number of said plurality of broadcasting devices can be received at each of said multiple locations, said predicting using a schedule describing when each of said plurality of broadcasting devices is within broadcast range of each of said multiple locations.

7. The method as recited in claim 1 further comprising the step of:
   using said timetable for mission planning, said mission planning for deriving a schedule for visiting each of said multiple locations at a time and date when a broadcast signal can be received from a necessary number of said plurality of broadcasting devices.

8. The method as recited in claim 1 further comprising the step of:
   updating said timetable for subsequent times and dates at which said checking of said step a) and said recordings of said steps b) and c) are performed.

9. A method for generating and maintaining a location-sensitive database comprising a timetable, said method comprising the steps of:
   a) identifying characteristics describing features at each of multiple locations; and
   b) predicting times and dates at which broadcast signals from a necessary number of a plurality of broadcasting devices can be received at each of said multiple locations;
   wherein said predicting uses said characteristics of said step a) to identify when a feature obstructs a broadcast signal, said predicting also using a schedule describing when each of said plurality of broadcasting devices is within broadcast range of each of said multiple locations.

10. The method as recited in claim 9 wherein said plurality of broadcasting devices are devices in a positioning system, wherein said broadcast signals are used by a receiving device to determine position.

11. The method as recited in claim 10 wherein said receiving device is an integrated position and direction system comprising:
   a receiver operable to receive said broadcast signals;
   a microprocessor operable to determine position and to determine heading;
   a digital compass operable to determine direction; and
   a display coupled to said microprocessor and to said digital compass, said display operable to indicate said heading and said direction.

12. The method as recited in claim 11 wherein said step a) further comprises the step of:
   a1) determining a position for each of said multiple locations.

13. The method as recited in claim 9 wherein said characteristics comprise a height of said features and a position of said features.

14. The method as recited in claim 9 further comprising the step of:
   using said timetable for mission planning, said mission planning for deriving a schedule for visiting each of said multiple locations at a time and date when a broadcast signal can be received from a necessary number of said plurality of broadcasting devices.

15. The method as recited in claim 9 further comprising the steps of:
   checking at each of said multiple locations for said broadcast signals;
   updating said timetable for subsequent times and dates at which said checking is performed.

16. A system for generating and maintaining a database comprising a location-sensitive timetable, said system comprising:
   a receiving device adapted to receive broadcast signals from a plurality of broadcasting devices; and
   a computing device comprising a processor and a memory unit, said computing device coupled to said receiving device and adapted to receive data from said receiving device;
   wherein said receiving device is adapted to check for broadcast signals for multiple locations, said receiving device also adapted to record a time and date for each said check and to record a number of said plurality of broadcasting devices from which a broadcast signal can be received at each of said multiple locations; and
   wherein said computing device uses said time and date and said number to generate said timetable identifying times at which broadcast signals from a necessary number of said plurality of broadcasting devices can be received at each of said multiple locations.

17. The system of claim 16 wherein said plurality of broadcasting devices are devices in a positioning system, wherein broadcast signals are used for determining a position of each of said multiple locations.

18. The system of claim 17 wherein said receiving device is an integrated position and direction system comprising:
   a receiver operable to receive broadcast signals;
   a microprocessor operable to determine position and to determine heading;
   a digital compass operable to determine direction; and
   a display coupled to said microprocessor and to said digital compass, said display operable to indicate said heading and said direction.

19. The system of claim 16 wherein said receiving device is adapted to record information identifying each of said plurality of broadcasting devices from which a broadcast signal is received.

20. The system of claim 19 wherein said computing device predicts other times and dates at which broadcast signals from a necessary number of said plurality of broadcasting devices can be received at each of said multiple locations, said computing device using a schedule describing when each of said plurality of broadcasting devices is within broadcast range of each of said multiple locations.

21. The system of claim 16 wherein said timetable is used for mission planning, said mission planning for deriving a schedule for visiting each of said multiple locations at a time and date when a broadcast signal can be received from a necessary number of said plurality of broadcasting devices.

22. The system of claim 16 wherein said timetable is updated for times and dates for subsequent checks for broadcast signals.

23. A computer system comprising:
   a bus;
   a memory unit coupled to said bus; and
   a processor coupled to said memory unit, said processor for implementing a method for generating and maintaining a location-sensitive database comprising a timetable, said method comprising the computer-implemented steps of:
   a) receiving characteristics describing features at each of multiple locations; and
   b) predicting times and dates at which broadcast signals from a necessary number of a plurality of broadcasting devices can be received at each of said multiple locations;
   wherein said predicting uses said characteristics of said step a) to identify when a feature obstructs a broadcast signal, said predicting also using a schedule describing when each of said plurality of broadcasting devices is within broadcast range of each of said multiple locations.

24. The computer system of claim 23 wherein said plurality of broadcasting devices are devices in a positioning system, wherein said broadcast signals are used by a receiving device to determine position.

25. The computer system of claim 24 wherein said receiving device is an integrated position and direction system comprising:
   a receiver operable to receive said broadcast signals;
   a microprocessor operable to determine position and to determine heading;
   a digital compass operable to determine direction; and
   a display coupled to said microprocessor and to said digital compass, said display operable to indicate said heading and said direction.

26. The computer system of claim 25 wherein said step a) of said method further comprises the step of:
   a1) receiving a position for each of said multiple locations.

27. The computer system of claim 23 wherein said characteristics comprise a height of said features and a position of said features.

28. The computer system of claim 23 wherein said method further comprises the step of:
   using said timetable for mission planning, said mission planning for deriving a schedule for visiting each of said multiple locations at a time and date when a broadcast signal can be received from a necessary number of said plurality of broadcasting devices.

* * * * *